(12) United States Patent
Pandya et al.

(10) Patent No.: US 10,705,684 B2
(45) Date of Patent: Jul. 7, 2020

(54) SYSTEM AND METHOD FOR DISPLAYING AN ELECTRONIC CHECKLIST FOR AN AIRCRAFT

(71) Applicant: THE BOEING COMPANY, Chicago, IL (US)

(72) Inventors: Vikram H. Pandya, St. Charles, MO (US); Joshua Lee Downs, St. Charles, MO (US); Alex Jay Campise, Creve Coeur, MO (US); Mark Ivan Nikolic, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 94 days.

(21) Appl. No.: 15/480,249

(22) Filed: Apr. 5, 2017

(65) Prior Publication Data

US 2018/0292953 A1    Oct. 11, 2018

(51) Int. Cl.
*G06F 9/48*       (2006.01)
*G06F 3/0482*   (2013.01)
*G06F 3/0488*   (2013.01)
*G06F 3/0484*   (2013.01)
*B64D 43/00*    (2006.01)

(52) U.S. Cl.
CPC .......... *G06F 3/0482* (2013.01); *B64D 43/00* (2013.01); *G06F 3/0488* (2013.01); *G06F 3/04847* (2013.01); *G06F 3/04886* (2013.01); *Y02T 50/44* (2013.01)

(58) Field of Classification Search
CPC .. G06F 3/0482; G06F 3/04847; G06F 3/0488; G06F 3/04886; B64D 37/28; B64D 37/26; B64D 43/00; Y02T 50/44
See application file for complete search history.

(56) References Cited

U.S. PATENT DOCUMENTS 5,454,074 A    9/1995  Hartel et al.
6,262,720 B1   7/2001  Jeffrey et al.
(Continued)

FOREIGN PATENT DOCUMENTS

WO    WO0235303 A2    5/2002

OTHER PUBLICATIONS

Downs, et al., U.S. Appl. No. 15/299,352, filed Oct. 20, 2016, 39 pages.
(Continued)

*Primary Examiner* — Jennifer N To
*Assistant Examiner* — KC Chen
(74) *Attorney, Agent, or Firm* — Moore Intellectual Property Law, PLLC

(57) ABSTRACT

A system includes display equipment and a processor coupled to the display equipment. The processor is configured to cause the display equipment to display an electronic checklist associated with an aircraft. The processor is configured determine whether the electronic checklist includes a checklist item associated with a particular control page of a plurality of control pages. The processor is configured to, based on determining that the electronic checklist includes the checklist item associated with the particular control page, cause the display equipment to display the particular control page that includes a control element that is selectable to cause a control command to be sent to one or more components.

20 Claims, 8 Drawing Sheets

(56) References Cited

U.S. PATENT DOCUMENTS

| | | |
|---|---|---|
| 6,609,082 B2 | 8/2003 | Wagner |
| 6,636,786 B2 | 10/2003 | Partel |
| 6,753,891 B1 | 6/2004 | Chohan et al. |
| 6,759,891 B2 | 6/2004 | Chohan et al. |
| 7,392,486 B1* | 6/2008 | Gyde ..................... B64D 43/00 |
| | | 701/14 |
| 8,660,718 B2 | 2/2014 | Holder |
| 8,761,971 B2 | 6/2014 | Gershzohn |
| 9,569,323 B1* | 2/2017 | Gershzohn .......... G06F 11/2257 |
| 2004/0088535 A1* | 5/2004 | Jones ................... G06F 9/4401 |
| | | 713/100 |
| 2008/0134017 A1* | 6/2008 | Inoguchi ................ G06F 9/451 |
| | | 715/234 |
| 2012/0209468 A1 | 8/2012 | Thomas |
| 2013/0066487 A1 | 3/2013 | Holder |
| 2014/0095012 A1 | 4/2014 | Wischmeyer |
| 2014/0200748 A1 | 7/2014 | Porez et al. |
| 2015/0348420 A1 | 12/2015 | Kneuper et al. |
| 2016/0004374 A1 | 1/2016 | Kneuper et al. |
| 2016/0300551 A1* | 10/2016 | Branthomme .......... G09G 5/363 |
| 2017/0088285 A1* | 3/2017 | Wischmeyer .......... B64D 45/00 |
| 2017/0183085 A1* | 6/2017 | Branthomme ............ F02C 9/26 |
| 2017/0210484 A1* | 7/2017 | Figard .................... B64D 45/00 |

OTHER PUBLICATIONS

Communication pursuant to Article 94(3) EPC dated Jan. 22, 2019 in EP 17195628.7, 5 pgs.

Gulfstream Symmetry Flight Deck—Piloting Perfected http://www.gulfstream.com/technology/symmetry-flight-deck, printed May 15, 2019, 3 pgs.

Gulfstream, Phase-of-Flight Intelligence Immersive Integration, http://www.gulfstream.com/technology/phase-of-flight-intelligence, printed May 15, 2019, 3 pgs.

Extended European Search Report for Application No. 17195628.7, dated Dec. 8, 2017, 7 pgs.

\* cited by examiner

SYSTEM AND METHOD FOR DISPLAYING AN ELECTRONIC CHECKLIST FOR AN AIRCRAFT

FIELD OF THE DISCLOSURE

The present disclosure is generally related to electronic checklists.

BACKGROUND

Checklists are used to facilitate proper configuration and operation of complex systems, such as an aircraft. Each checklist includes multiple checklist items corresponding to steps to be performed, checks to be completed, etc. For example, some of the checklist items may direct a pilot or operator to access many different control pages and configure multiple components across the many different control pages (of a soft controls system/touchscreen graphical user interface. Accessing the many different control pages and locating a particular soft control (e.g., a particular touchscreen control) may be unnecessarily laborious and can divert time and attention from other operational duties. Additionally, when using soft controls (e.g., selecting a particular touchscreen control), selection of undesired controls (e.g., "knuckle strike") may occur, thereby reducing efficiency and diverting the pilot's attention. Vehicles, such as an aircraft, often have smaller displays as compared to fixed systems, such as power plant, which may increases selection of undesired controls (e.g., "knuckle strike") because the controls may be smaller and the spacing between controls may be smaller.

SUMMARY

In a particular implementation, a system includes display equipment and a processor coupled to the display equipment. The processor is configured to cause the display equipment to display an electronic checklist associated with an aircraft. The processor is configured determine whether the electronic checklist includes a checklist item associated with a particular control page of a plurality of control pages. The processor is configured to, based on determining that the electronic checklist includes the checklist item associated with the particular control page, cause the display equipment to display the particular control page that includes a control element that is selectable to cause a control command to be sent to one or more components.

In another particular implementation, a non-transitory processor-readable medium storing processor-executable instructions that, when executed by a processor, cause the processor to cause display equipment of an aircraft to display at least a portion of an electronic checklist. The processor-executable instructions further cause the processor to cause the display equipment to display a first control page of a plurality of control pages, the plurality of control pages including control elements for controlling systems of the aircraft. The first control page is selected for display based on the first control page including a control element associated with the portion of the electronic checklist.

In another particular implementation, a method includes displaying, at display equipment of an aircraft, at least a portion of an electronic checklist. The method also includes displaying, at the display equipment of the aircraft, a first control page of a plurality of control pages of a user interface. The plurality of control pages include control elements which control systems of the aircraft and the first control page is selected for display based on the first control page including a control element associated with the portion of the electronic checklist.

In another particular implementation, a system includes display equipment configured to display at least a portion of an electronic checklist and a first control page of a plurality of control pages of a user interface. The electronic checklist includes a first checklist item associated with a first component of an aircraft and a second checklist item associated with a second component of the aircraft. The plurality of control pages include control elements which control components of the aircraft, and the first control page corresponds to the first checklist item. The system also includes a processor coupled to the display equipment and configured to cause the display equipment to, responsive to determining completion of the first checklist item, automatically cause the display equipment to display a second control page of the plurality of control pages based on the second checklist item of the electronic checklist being associated with the second control page. The second control page includes a control element that is selectable to cause a control command to be sent to the second component.

In another particular implementation, a method includes displaying at least a portion of an electronic checklist and a first control page of a plurality of control pages of a user interface. The electronic checklist includes a first checklist item associated with a first component of an aircraft and a second checklist item associated with a second component of the aircraft. The plurality of control pages include control elements which control components of the aircraft, and the first control page corresponds to the first checklist item. The method also includes responsive to determining completion of the first checklist item, automatically displaying a second control page of the plurality of control pages based on the second checklist item of the electronic checklist being associated with the second control page.

DETAILED DESCRIPTION

Figure 1:
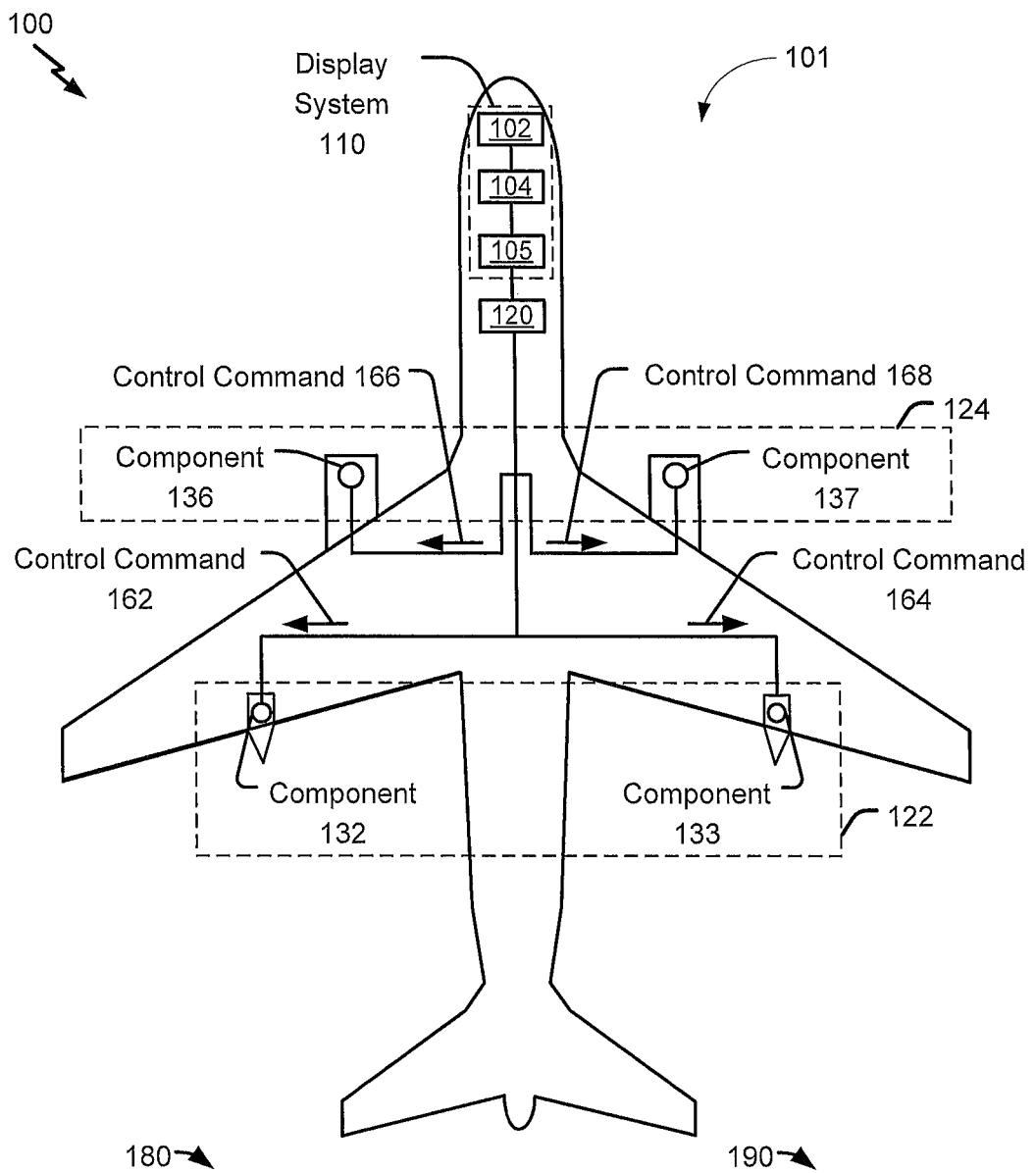
FIG. 1 illustrates an example of an aircraft that includes a display system configured to display an electronic checklist, a control page, and a control element that is selectable to send control commands to one or more components of the aircraft.
Figure 1:
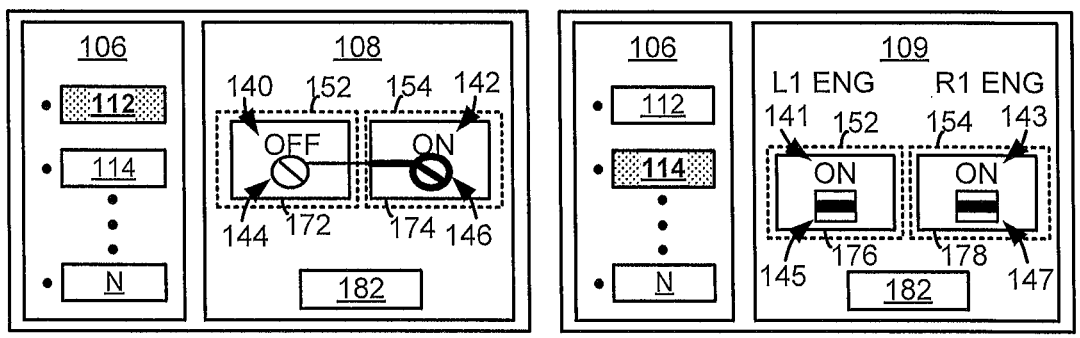

Implementations disclosed herein are directed to a system and method for automatically (e.g., independent of user input) displaying a control page of a plurality of control pages of a graphical user interface (GUI) that is associated with an active step of an electronic checklist. The implementations disclosed herein enable controlling one or more components of a system (or a subsystem thereof) associated with the electronic checklist by using control elements displayed on an electronic display. The system includes multiple subsystems (each subsystem including one or more components), the electronic display, and a processor coupled to the electronic display. The processor is configured to cause the electronic display to display an electronic checklist associated with the system. For example, the electronic checklist includes checklist items corresponding to a plurality of subsystems of the multiple systems. The processor is configured to determine which subsystem is associated with a particular checklist item. The processor is further configured to, based on determining that the checklist item is associated with a particular subsystem, cause the electronic display to display a corresponding control page that includes a control element that is selectable to send a control command to one or more components of the particular subsystem.

Additionally, when displaying the control page, one or more control elements associated with the active step may be emphasized (e.g., highlighted). In addition, when displaying the control page other control elements (e.g., control elements associated with previously completed steps or uncompleted steps) may be de-emphasized or deactivated. Further, a toggle selection may be used to control presentation of the control elements of the control pages. For example, the toggle selection may have multiple positions with each position corresponding to a different style of presentation. To illustrate, a first position may correspond to a default position in which one or more control elements are displayed with a modified display property (e.g., emphasized, de-emphasized, or deactivated) based on the electronic checklist (e.g., an active item of the electronic checklist). A second position may correspond to an override position in which modifying a display property of control elements is disabled and control elements are displayed based on stored data and independent of data associated with the electronic checklist. A third position may correspond to a manual or user defined configuration to enable the user to manually select which control elements are displayed and how the control elements are displayed (e.g., an emphasized display property, a de-emphasized display property, etc.).

Because the system automatically (e.g., independent of user input) navigates to a control page and emphasizes a control element thereof corresponding to an active step of an electronic checklist, a user can find the control element quicker and more easily than if the user had to navigate to the correct control page and find an non-emphasized control element. This eliminates the task of navigating to a correct control page and allows a user to more quickly identify an element to select which reduces the time it takes to complete a step in a procedure. Emphasizing control elements also reduces the chance of user error when using control elements, because the selective emphasis on the corresponding control element or control elements reduces the chance that the user will purposefully select the wrong control element. Deactivating or removing control elements reduces errors associated with knuckle-strike (e.g., accidentally select the wrong control element). Another benefit to this approach is that it may reduce the amount of training needed to effectively execute procedures.

FIG. 1 illustrates a diagram 100 of an aircraft 101 that includes multiple subsystems (e.g., a first subsystem 122 and a second subsystem 124) and includes a display system 110 that includes a processor 102 and display equipment 104. In some implementations, the display equipment 104 includes multiple electronic displays. In a particular implementation, one or more electronic displays of the multiple electronic displays includes or corresponds to a touchscreen display (e.g., an electronic display that is responsive to touch input from a user). Each subsystem 122 and 124 of the multiple subsystems includes one or more components (e.g., components 132 and 133 and components 136 and 137, respectively). The subsystems 122 and 124 may include or correspond to one or more aircraft subsystems, such as a fuel subsystem, an engine subsystem, an electrical subsystem, a hydraulic subsystem, etc. The one or more components of the subsystems 122 and 124 may include or correspond to mechanical components, electrical components, electromechanical components, or a combination thereof, such as nozzles, pumps, valves, packs, circuits, switches, or controllable/movable/selectable aircraft surfaces (e.g., flaps). In FIG. 1, the first subsystem 122 includes a first component 132 and a second component 133, and the second subsystem 124 includes a third component 136 and a fourth component 137. As an example, the first subsystem 122 corresponds to a fuel subsystem and the multiple components 132 and 133 correspond to multiple fuel jettison nozzles, and the second subsystem 124 corresponds to an engine subsystem and the multiple components 136 and 137 correspond to engines.

The processor 102 is configured to cause the display equipment 104 to display an electronic checklist 106 associated with a plurality of subsystems of the multiple subsystems. The electronic checklist 106 is a checklist for "proper" configuration and operation of the aircraft 101 and includes one or more checklist items, such as the checklist items 112, 114, . . . N. Each of the checklist items 112, 114, . . . N may indicate or direct that one or more components (that are associated with the checklist item) be configured in a particular state. The electronic checklist 106 may be completed by addressing each of the checklist items 112, 114, . . . N. The checklist items 112, 114, . . . N may be addressed by performing procedures associated with the checklist items 112, 114, . . . N or by causing components associated with the checklist items 112, 114, . . . N to be configured in states associated with the checklist items 112, 114 . . . N.

In some implementations, the processor 102 may be configured to progress through the checklist items 112, 114, . . . N according to a specified order. For example, a memory (e.g., a non-transitory processor-readable medium 881 of FIG. 8) may store data indicating an order that the checklist item 112 is to be addressed first and that the checklist item 114 is to be addressed upon completion of the checklist item 112. In this example, the processor 102 may be configured to progress through the electronic checklist 106 by addressing the checklist item 112 first and by addressing the checklist item 114 when the checklist item 112 is completed. The processor 102 may determine a checklist item is complete by receiving an indication from a subsystem controller 120, or receiving an input from the user via the display equipment 104 indicating that the checklist item is complete. Alternatively or additionally, individual checklist items of the electronic checklist 106 may be selectable (e.g., by a user, such as a pilot or operator) to control the order in which the checklist items 112, 114, . . . N are addressed. For example, a user may desire to address the checklist item 114 prior to addressing the checklist item 112. In this example, the user may select (e.g., by providing input at the display equipment 104) and address/complete the checklist item 114 prior to addressing/completing the checklist item 112. Thus, an order of progression through the electronic checklist 106 may be based on input (at the display equipment 104) from a user.

In the implementation illustrated in FIG. 1, the checklist item 112 is associated with a state of a single component of the first subsystem 122. For example, the checklist item 112 may correspond to a single control element (e.g., a soft control or a switch) being configured in a particular position. Additionally, in the implementation illustrated in FIG. 1, the checklist item 114 is associated with states of multiple components of the second subsystem 124. For example, the checklist item 114 may be associated with states of the components 136 and 137. To illustrate, the multiple components 136 and 137 may include an engine, and the checklist item 114 may direct that the engines be configured in a particular state.

In the illustrated implementation, the processor 102 is configured to cause the display equipment 104 to display a particular control page (e.g., a synoptic page) of a graphical user interface (GUI) based the electronic checklist 106 (e.g., checklist items thereof). The GUI includes a plurality of control pages, such as a first control page 108 and a second control page 109. FIG. 1 includes a first diagram 180 that illustrates display of the first control page 108 at a first time and a second diagram 190 that illustrates display of the second control page 109 at a second time. Although the first control page 108 and the second control page 109 are illustrated as being displayed on the same electronic display of the display equipment 104 as the electronic checklist 106, in other implementations the first control page 108 or the second control page 109 is displayed on a different electronic display of the display equipment 104 than the display on which the electronic checklist 106 is displayed. In the implementation illustrated in FIG. 1, the electronic display corresponds a multifunction display. Further, at certain times, a control page may not be displayed concurrently with the electronic checklist 106. For example, a user may navigate away from a currently displayed control page by selecting another control page or another screen of the GUI. As another example, a user may navigate away from a currently displayed control page by moving a selector switch 105 of the display system 110, as described further herein.

Each control page presents component state data (e.g., using state display symbols) that describes a state of a component of the subsystem. Additionally or alternatively, each control page is configured to present command state data that indicates one or more command states (e.g., on/off, armed/unarmed, . . . etc.) of the component. The component state data and the command state data associated with a component may be displayed within a region of the control page associated with the component. To illustrate, information associated with the first component 132 (e.g., a first nozzle) is displayed within a region 152 of the first control page 108 (and the display equipment 104) and information associated with the second component 133 (e.g., a second nozzle) is displayed within a region 154 of the first control page 108 (and the display equipment 104). In the implementation illustrated in FIG. 1, the component state data includes a symbol 144 (within the region 152) indicating that the first nozzle is off and a second symbol 146 (within the region 154) indicating that the second nozzle is on, and the command state data includes text 140 (within the region 152) indicating that the first nozzle is off and includes text 142 (within the region 154) indicating that the second nozzle is on. The second control page 109 information associated with the third component 136 (e.g., a first engine) is displayed within the region 152 and information associated with the fourth component 137 (e.g., a second engine) is displayed within the region 154. In the implementation illustrated in FIG. 1, the component state data includes a symbol 145 (within the region 152) indicating that the first engine is on and a second symbol 147 (within the region 154) indicating that the second engine is on, and the command state data includes text 141 (within the region 152) indicating that the first engine is on and includes text 143 (within the region 154) indicating that the second engine is on. In some implementations, a layout (e.g., a placement of the regions on the display equipment 104 and with respect to other regions) of a particular control page of the plurality of control pages corresponds to a layout of physical controls or switches, such as a layout of overhead pilot controls and switches.

Each control page further includes a plurality of control elements that are selectable to send control commands to one or more components of the aircraft 101. As illustrated in FIG. 1, the first control page 108 includes a first control element 172 and a second control element 174 and the second control page 109 includes a third control element 176 and a fourth control element 178. The control commands enable change of a state of one or more components of the aircraft 101 (or a subsystem thereof). Each control element of the plurality of control elements (e.g., the control elements 172-178) corresponds to a region (e.g., the region 152 or the region 154) of the display equipment 104 or the control page. Each control element of the plurality of control elements includes text, symbols, or a combination thereof. The text and symbols may correspond to the component data and the command state data, as described above. The processor 102 may generate and send a control command to a component associated with a particular control element responsive to an input received via the display equipment 104 at a region corresponding to the particular control element. For example, the processor 102 generates and sends a first control command 162 to the first component 132 responsive to an input at the region 152 that corresponds to the first control element 172.

Thus, a control page provides symbols and text indicating current states of one or more components of a subsystem that are associated with an active item of electronic checklist 106. The symbols and text are located/displayed in a region of the control page that is associated with the component. The control page thereby presents information regarding a state of a component in a same region that a user may be prone to look when addressing the state of the component. Presenting the state information near the representation of the component may reduce an amount of visual attention needed by a user to determine a state of a component as compared to electronic checklist systems that do not provide state data on the electronic control interface (e.g., on a touchscreen) or that provide the state data in a different region than the representation of the component on the electronic control interface. Additionally, the control page provides control over the state of one or more components of the aircraft 101 by providing a plurality of control elements that are selectable to send control commands to one or more components of the aircraft to control the state of the one or more components. A control element may include one or more functions (e.g., one or more discrete functions) that are selectable to control a state or configuration of individual components of the subsystem as described in more detail herein with reference to FIGS. 2 and 3.

The processor 102 is configured to determine whether the electronic checklist 106 includes a checklist item (e.g., an active item) associated with a particular control page of a plurality of control pages and to cause the display equipment 104 to display the particular control page. For example, the processor 102 is configured to determine a particular control page corresponds to a portion of the electronic checklist 106. To illustrate, the processor 102 determines that the first control page 108 corresponds to the checklist item 112 (e.g., an active item) of the electronic checklist 106 and displays the first control page 108 via the display equipment 104. The processor 102 may determine that the first control page 108 corresponds to the checklist item 112 based on the data of the electronic checklist 106 or based on data stored at the memory. For example, the data of the electronic checklist or the data stored at the memory indicates a particular control page.

As another example, the processor 102 is configured to determine that a particular control page includes a control element associated with the portion (e.g., the active item) of the electronic checklist 106. To illustrate, the processor 102 determines that the first control page 108 includes the first control element 172 which corresponds to the checklist item 112 (e.g., an active item) of the electronic checklist 106 based on the data of the electronic checklist or based on the data stored at the memory. For example, the data of the electronic checklist or the data stored at the memory indicates a particular control element of a control page.

The processor 102 is configured to determine completion of a checklist item. For example, the processor 102 receives (e.g., from the subsystem controller 120) an indication or an update that the checklist item is completed. As another example, the processor 102 determines completion of the checklist item 112 via an input at the electronic checklist 106 indicating that the checklist item 112 has been completed: As yet another example, the processor 102 determines completion of the checklist item 112 via input at the region 152 of the first control page corresponding to the first control element 172.

After determining completion of a checklist item, the processor 102 is configured to determine a control page or a control element correspond to a next active checklist item and to update the display of the display equipment 104. To illustrate, after the first control element 172 has been selected (or manipulated) and the state of the corresponding component changed (e.g., to complete the checklist item 112), the processor 102 may determine a control page or a control element corresponding to a next checklist item (e.g., the checklist item 114) of the electronic checklist 106. Alternatively, a checklist item may not require manipulation of a state of a component. In such instances, responsive to receiving an input that the active checklist item is completed or responsive to the processor 102 determining that the active checklist item has been completed the processor 102 may be configured to determine a control page or a control element corresponding to a next checklist item (e.g., the checklist item 114) of the electronic checklist 106.

Additionally or alternatively, a user may choose to perform checklist items of the displayed sequence out of order. In such instances, responsive to user selection of another checklist item of the electronic checklist 106, the processor 102 may be configured to determine a control page or a control element corresponding to the selected checklist item (e.g., the checklist item 114) of the electronic checklist 106. For example, the processor 102 is configured to determine that the second control page 109 (or a control element thereof) corresponds to the checklist item 114 responsive to user selection of the checklist item 114.

By displaying a corresponding control page and control element of an active item of an electronic checklist, an amount of time and visual attention required by a user to perform the active checklist item and the electronic checklist may be reduced. For example, the task of accessing the many different control pages to perform the checklist is eliminated, thus saving the user time and visual attention.

In some implementations, the processor 102 is configured to visually emphasize one or more control elements on the first control page 108 that are associated with an active checklist item based on the electronic checklist 106. For example, the one or more control elements may be emphasized based on an active item of the electronic checklist 106, one or more uncompleted items of the electronic checklist 106, or a combination thereof. To illustrate, the control element 172 that corresponds to the component 132 is emphasized when the checklist item 112 that corresponds to the component 132 is active. Visually emphasizing a control element includes visually emphasizing a display property of a region of the control page corresponding to the control element or a display property of text, symbols, or both, in the region. To illustrate, a display property of the component state data, the command state data, or both, may be visually emphasized.

For example, the processor 102 causes the display equipment 104 to display one or more control elements of the first control page 108 with a display property that visually emphasizes the one or more control elements. To illustrate, when the checklist item 114 is active, the processor 102 may highlight or otherwise emphasize the regions 152 and 154 (including elements thereof, such as the command state data, the component state data, or a combination thereof) associated with the components 136 and 137. Other display properties that may be visually emphasized include size, blinking, backlighting, color, highlighting (e.g., background color), font, font styles (bold, italics, underline), etc. In some implementations, multiple display properties of a control element may be visually emphasized. In a particular implementation, the processor 102 may emphasize different control elements in different ways. For example, the processor 102 may emphasize a first particular control using blinking lights and a second particular control using backlighting. As another example, the processor 102 emphasizes a first particular control element using highlighting and emphasizes a second particular control using bolding or increasing size. In such implementations, the first particular control element may correspond to an active item and a second particular control element may correspond to an uncompleted item (e.g., a next active item).

Emphasizing control elements that are associated with an active checklist item may reduce an amount of visual attention used by a user when addressing the active checklist item by directing the attention of the user to the relevant (active) control elements displayed on the display equipment 104 as compared to systems that do not emphasize control elements.

Additionally, in some implementations the processor 102 is configured to visually emphasize mis-selected controls (e.g., erroneously selected controls). To illustrate, the processor 102 may change a display property of a mis-selected control element to increase in a size, a blinking rate, backlighting, a color, be highlighting (e.g., in a different color), a font, a font style (e.g., bold, italics, be underline), etc. A modified display property of a mis-selected control element may be different from a modified display property of a control element associated with an active step. For example, a control element of an active step and a mis-selected control element may have different backlight colors.

Additionally or alternatively, the processor 102 may be configured to visually emphasize physical controls of the aircraft 101 that are associated with an active checklist item to be emphasized. For example, the borders or lines around one or more physical controls may be illuminated via back lighting when the one or more physical controls are associated with an active checklist item. The one or more physical controls may not be illuminated when the checklist item is inactive.

Additionally or alternatively, the processor 102 is configured to visually de-emphasize one or more control elements of a control page based on the active item of the electronic checklist 106, based on one or more completed items of the electronic checklist 106, based on one or more uncompleted items of the electronic checklist 106, or a combination thereof. For example, the processor 102 causes the display equipment 104 to display one or more control elements of the first control page 108 with a display property that visually deemphasizes the one or more control elements. To illustrate, the one or more control elements may be grayed out based on not being associated with an active item (e.g., the checklist item 112 or the checklist item in 114) of the electronic checklist 106. In such implementations, all control elements of a control page may be grayed out except a particular control element that corresponds to the active item of the electronic checklist 106. In some implementations, the processor 102 is further configured to visually de-emphasize control elements based on uncompleted (e.g., remaining) checklist items, non-checklist items, or both. A control element corresponding to an uncompleted checklist item may be visually de-emphasized in a different way than control elements corresponding to other items, such as completed checklist items or non-checklist items.

Additionally or alternatively, the processor 102 is configured to deactivate or disable one or more control elements of a control page based on the active item of the electronic checklist 106, based on one or more completed items of the electronic checklist 106, based on one or more uncompleted items of the electronic checklist 106, or a combination thereof. To illustrate, control elements of a control page may be unselectable by a user except for a particular control element that corresponds to the active item of the electronic checklist 106. As compared to deemphasizing a control element, deactivating or disabling the control element may not change the visual property, but the control element may not be selectable (e.g., the processor 102 may ignore inputs at the region corresponding to the control element) and/or the processor 102 may refrain from sending control commands to subsystems of the aircraft 101 responsive to the input received at the region.

Additionally or alternatively, the processor 102 is configured to remove or refrain from displaying one or more control elements of a control page based on an active item of the electronic checklist 106, based on one or more completed items of the electronic checklist 106, one or more uncompleted items of the electronic checklist 106, or a combination thereof. For example, the processor 102 may modify the display equipment 104 and a control page such that one or more control elements are removed or the processor 102 may display a new control page which omits one or more control elements that normally appear on the control page. In some implementations, spatial aspects between the control elements may remain the same, but text and symbols corresponding to the one or more control elements may be removed from display. Regions corresponding to the removed control elements may still remain, although the regions may be empty (e.g., black). Alternatively, regions corresponding to the displayed controls may be increased to fill in the space or void generated by eliminating the regions of the removed controls. In a particular implementation, uncompleted (e.g., remaining) checklist items are also removed.

The display system 110 further includes a memory coupled to the processor 102. The memory stores instructions executable by the processor 102 to perform the functions described above. In a particular implementation, the memory stores control page display data and display property modification data. The control page display data includes instructions for displaying a particular control page based on the electronic checklist 106. The display property modification data includes instructions for modifying a display property of a control element based on the electronic checklist 106 (e.g., checklist data). Alternatively, the processor 102 may be configured to search for a control element (or a corresponding control command) based on the electronic checklist 106.

In a particular implementation, the display system 110 further includes the selector switch 105 having multiple selectable positions. The selector switch 105 may correspond to a physical switch or a soft control (e.g., a control element). In such implementations, the processor 102 is configured to modify a display scheme based on a position of the selector switch 105. To illustrate, the selector switch 105 includes a first position corresponding to a default control setting in which one or more control elements of the particular control page are displayed with a modified display property based on the electronic checklist 106 and the display property modification data. The selector switch 105 also includes a second position corresponding to an override control setting in which modified display properties of control elements are disabled and the one or more control elements of the particular control page are displayed independent of the electronic checklist 106 (and independent of the display property modification data). Configuring the selector switch 105 in the first position causes display of a control page according to the default control setting, and configuring the selector switch 105 in the second position causes display of a control page according to the override control setting.

In some implementations, the selector switch 105 includes a third position corresponding to a user defined control setting. In such implementations, the memory is configured to store user preference data. The processor 102 may be configured to generate the user preference data responsive to user input. For example, a user may input commands to enable or disable emphasis, de-emphasis, deactivation, removal, etc. associated with display of control elements. Additionally, the user may input commands to configure how a particular type of visual configuration (e.g., emphasis or de-emphasis) is presented. For example, based on user input, highlighting instead of blinking may be selected for use in emphasis. Further, the user may input commands to configure how a particular control page is presented. To illustrate, the user may input commands such that control elements of a particular control page (e.g., an engine control page) are displayed with particular emphasis or are displayed unmodified. The processor 102 is configured to modify display properties of one or more control elements of a particular displayed control page based on the user defined preference data responsive to the selector switch 105 being in the third positon.

Additionally, the processor 102 is configured to cause the display equipment 104 to "revert back to" (e.g., re-display) a previous screen (e.g., a particular screen displayed via the display equipment 104 before the electronic checklist 106 was selected or before display the first control page 108). To illustrate, a navigation screen of the GUI is displayed on the display equipment 104 at a time prior to starting the electronic checklist 106. Responsive to completing the electronic checklist 106, completing a portion of the electronic checklist 106, or leaving the electronic checklist 106, the processor 102 causes the display equipment 104 to again display the navigational screen.

In some implementations, the first control page 108 may additionally implement one or more macro-functions that are associated with one or more checklist items. The one or more macro-functions enable direct configuration of multiple components into particular states (e.g., into a same state). The one or more macro-functions may be executable or selectable to control states or configurations of multiple components of a subsystem of the aircraft 101.

To implement macro-function capability, the processor 102 is configured to determine whether the electronic checklist 106 includes a checklist item associated with states of multiple components of the subsystem. To illustrate, the processor 102 is configured to determine whether the electronic checklist 106 includes a checklist item associated with states of two components, such as the components 132 and 133, or with states of the components 136 and 137. For example, the checklist item 114 may be associated with the components states of the components being configured in a particular (e.g., the same) state. To illustrate, the checklist item 114 may correspond to the component 136 (e.g., the first engine) and the component 137 (e.g., the second engine) being configured in a particular state (e.g., an OFF state). Alternatively, the particular state may be an ON state. Although the checklist item 114 is described as being associated with two components (e.g., the components 136 and 137) of a subsystem having the particular state, the checklist item 114 may be associated with more than two components of a subsystem having the particular state.

To implement the macro-function capability, the processor 102 is further configured to selectively display a macro-function control element 182 (e.g., a single control element) that is selectable to configure states of the multiple components. For example, the processor 102 is further configured to cause the display equipment 104 to display the macro-function control element 182 based on determining that the electronic checklist 106 includes the checklist item 114 that is associated with multiple components (e.g., the components 136 and 137) being configured in a same state. In some implementations, the macro-function control element 182 is presented on the first control page 108, on the second control page 109, or both. Alternatively or additionally, in other implementations, the macro-function control element 182 is presented within the electronic checklist 106 portion of the display equipment 104. In a particular implementation, the user preference data may include data indicating a display setting associated with a macro-function control element.

The macro-function control element 182 may be displayed when the checklist item associated with the macro-function control element 182 is active (e.g., is the next open checklist item or is selected by a user). In such implementations, upon determining that the checklist item 114 is the next open checklist item, the processor 102 may cause the macro-function control element 182 to be displayed. Alternatively, the macro-function control element 182 may be associated with the checklist item 114, and a user may select the checklist item 114 by providing input at the electronic checklist. The processor 102 may cause the macro-function control element 182 to be displayed responsive to the user selecting the checklist item 114.

In some implementations, the macro-function control element 182 is not displayed when the checklist item associated with the macro-function control element 182 is not active (e.g., is not the next open checklist item or is not the selected checklist item). For example, the macro-function control element 182 may not be displayed when the checklist item 112 is active. Alternatively or additionally, the macro-function control element 182 may be displayed but may be inactive (e.g., un-selectable) when the checklist item associated with the macro-function control element 182 is not the next checklist item or is not the selected checklist item. For example, the macro-function control element 182 may be displayed but may be inactive when checklist item 112 is active. Thus, the macro-function control element 182 may be displayed or may be active when the checklist item associated with the macro-function control element 182 is active.

The macro-function control element 182 is selectable to send control commands 166 and 168 to multiple components (e.g., to the components 136 and 137). In some implementations, the macro-function control element 182 is selectable to send the control commands 166 and 168 to the components 136 and 137 without additional input at the display equipment 104. For example, selecting the macro-function control element 182 may cause the processor 102 to cause a subsystem controller 120 to send the control commands 166 and 168 to the components 136 and 137 without presenting a dialog window (e.g., a pop-up window) indicating additional input at the display equipment 104. Thus, the macro-function control element 182 may be selectable to send the control commands 166 and 168 to the components 136 and 137 responsive to selecting the macro-function control element 182.

Alternatively or additionally, in some implementations, selecting the macro-function control element 182 causes the processor 102 to cause the display equipment 104 to present a dialog window (e.g., a pop-up window), and the processor 102 causes the subsystem controller 120 to send the control commands 166 and 168 to the components 136 and 137 responsive to input at the dialog window. In some implementations, the dialog window includes component state data and command state data indicative of the state of the components 136 and 137, as described in further detail with reference to FIG. 4. In some implementations, the dialog window includes an inactive command portion and an active command portion, as described in further detail with reference to FIG. 4. To illustrate, the macro-function control element 182 may be associated with a checklist item directing that the components 136 and 137 be configured in the OFF state. In such implementations, the dialog window may display a region corresponding to an OFF command and a region corresponding to an ON command. In such implementations, the region corresponding to the OFF command may be active (e.g., selectable) while the region corresponding to the ON command may be inactive (e.g., un-selectable). Thus, the dialog window may enable selection of a command state consistent with the state associated with the checklist item and may disable selection capability of a command state that is inconsistent with the state associated with the checklist item. As another example, the inactive command portion and the active command portion may be based on determined states of the components 136 and 137, as described in further detail herein with reference to FIG. 4.

Thus, the display equipment 104 may include a macro-function that is selectable to control states of multiple components via a single selection (e.g., via a single touch input). The display equipment 104 therefore provides an electronic interactive control interface (e.g., a touchscreen) that enables individual control of a component (e.g., via discrete function capability) or control of multiple components via execution of the macro-function. Using the electronic interactive control interface to control states of components reduces volume, weight, and manufacturing and maintenance costs of the display system 110 as compared to systems that include physical control panels. Additionally, because the macro-function capability enables controlling multiple components via a single interaction (e.g., a single touch input at the electronic interactive control interface), the display system 110 enables less interaction between a user and the electronic display (e.g., the touchscreen) to complete a checklist item associated with multiple components as compared to display systems that control a state of a single component per user input (e.g., touch input).

Figure 6:
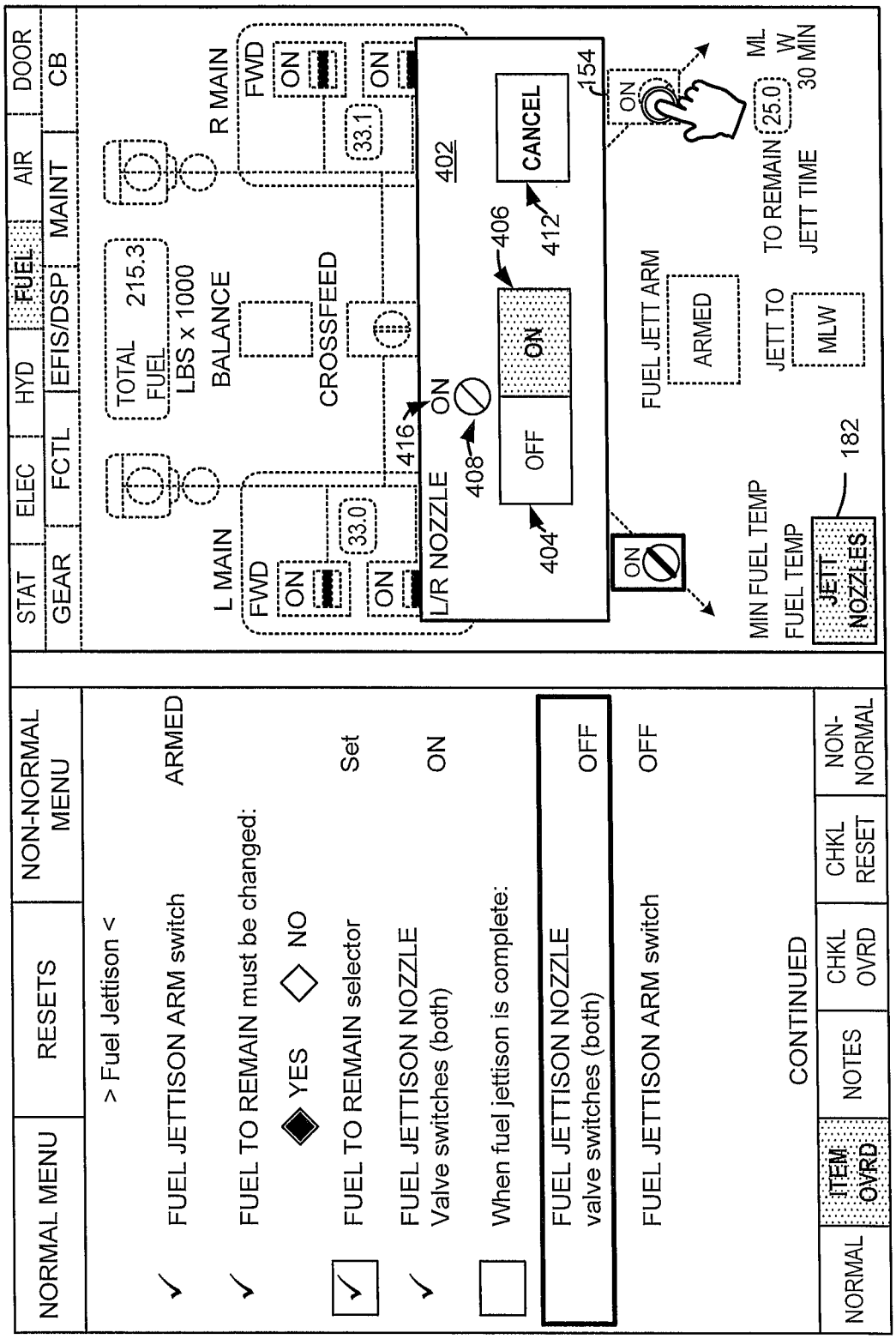
FIG. 6 illustrates an example of a modification of the dialog window of FIG. 4 based on to de-selection of a component of the multiple components.

In some implementations, one or more functions associated with the macro-function control element 182 may be de-selected (e.g., after a dialog window is displayed) as described in further detail herein with reference to FIG. 6. In such implementations, the processor 102 may be configured to cause an indication of a state of one component (e.g., a de-selected component) of the multiple components 136 and 137 to be removed from the dialog window, to disable or bypass a function of the macro-function that is associated with the de-selected component such that input at the dialog window does not result in a control command being sent to the de-selected component (e.g., to disable control of the de-selected component via the dialog window), or both. Thus, control of the de-selected component via the dialog window may be disabled responsive to input at the second control page 109 after the dialog window is displayed. A function of the macro-function that is associated with a de-selected component (e.g., the component 137) of the components 136 and 137 may therefore be disabled or bypassed such that selecting the macro-function control element 182 does not result in the control command 168 being sent to the de-selected component. The display system 110 (e.g., the processor 102) is thereby, in some implementations, configurable to cause the subsystem controller 120 to send, based on user input associated with the macro-function control element 182, one or more control commands to a subset of components (e.g., to some but not all components) of the subsystem that are associated with the macro-function control element 182 based on de-selection of one or more of the components of the subsystem.

In other implementations, the display system 110 is included in aircraft simulator. In such implementations, the components of the aircraft correspond to virtual components of the aircraft simulator and items of the electronic checklist are associated with the virtual components of the aircraft simulator. Additionally, the control elements are configured to change a state of the virtual component displayed on a control page of the display equipment 104.

An aircraft including the display system 110 may reduce a user's time and effort used to perform an electronic checklist by automatically displaying a control page that corresponds to an active item of the electronic checklist. Additionally, the display system 110 may also reduce the user's time and effort by emphasizing control elements, de-emphasizing control elements, or both. Furthermore, the display system 110 may reduce selection of undesired controls (e.g., knuckle strike) on a relatively small display or displays of the display equipment 104 by deactivating or removing control elements.

Figure 2:
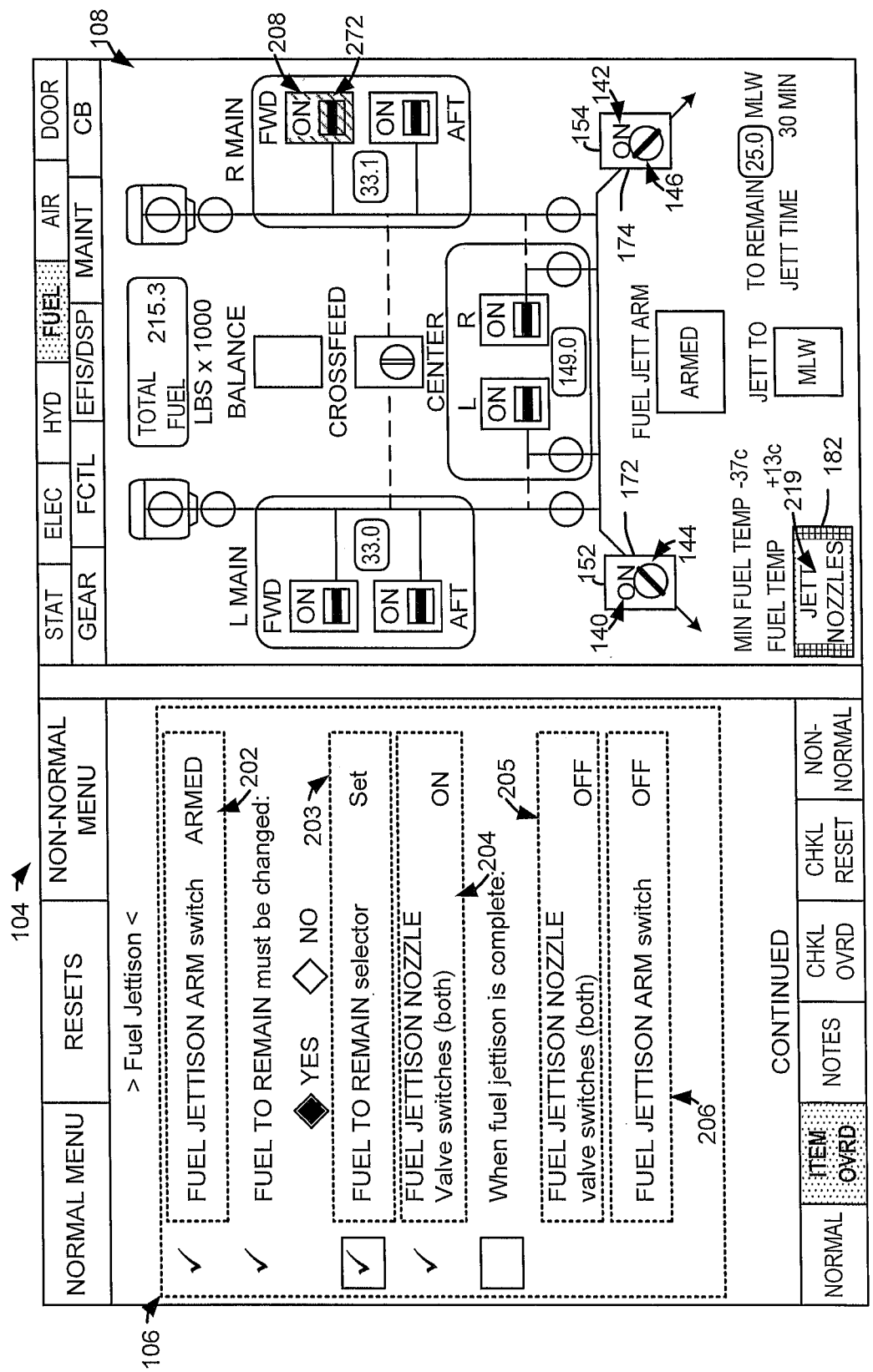
FIG. 2 illustrates an example of the electronic checklist, the control page, and the control element displayed by of the display of FIG. 1.

FIG. 2 illustrates an example of an electronic display of the display equipment 104 that includes (e.g., presents or displays) the electronic checklist 106 and the first control page 108 and that includes control elements which have discrete function capability and macro-function capability. In the implementation illustrated in FIG. 2, the electronic checklist 106 and the first control page 108 are associated with a fuel subsystem. The fuel subsystem includes multiple components, such as the components 132 and 133 of FIG. 1. For example, the components 132 and 133 may correspond to multiple fuel jettison nozzles. In such implementations, the electronic checklist 106 includes checklist items associated with a fuel jettison procedure. For example, the electronic checklist 106 includes a first checklist item 202 associated with a fuel jettison arm switch being armed, a second checklist item 203 associated with a fuel to remain selector being set, a third checklist item 204 associated with the components 132 and 133 being configured in an ON state, a fourth checklist item 205 associated with the components 132 and 133 being configured in an OFF state, and a fifth checklist item 206 associated with the fuel jettison arm switch being configured in an OFF state. The third checklist item 204 and the fourth checklist item 205 are associated with states of multiple components.

The display equipment 104 and the processor 102 may be configured to implement a discrete function capability via an input at a control element (e.g., a region corresponding to a single component) of the first control page 108. For example, a region 208 may include a symbol representing a state of a control element 272 (e.g., a right main forward control element) and the single component (e.g., a right main forward component). The processor 102 may be configured to perform or initiate a function to control a state of the control element 272 and the single component responsive to input at the region 208. To illustrate, the processor 102 may be configured to detect input at the region 208. In response to the input at the region 208, the processor 102 may initiate changing a state of the control element 272 and the right main forward component. To illustrate, the control element 272 may initially be in a first state (corresponding to the right main forward component being in an ON state). Responsive to input being received at the region 208, the processor 102 may cause the control element 272 to be configured in a second state (corresponding to the right main forward component being in an OFF state) and the processor 102 may send a signal to the subsystem controller 120 indicating that the right main forward component is to be configured in the OFF state. The subsystem controller 120 may send a control command to the right main forward component to cause the right main forward component to be configured in the OFF state. Thus, the control element 272 is selectable to send (or to initiate sending of) a control command to the right main forward component. Additionally or alternatively, the processor 102 may cause a dialog window to be displayed prior to sending a signal to the subsystem controller 120 responsive to input at the dialog window, as described in further detail herein with reference to FIG. 3. Thus, the processor 102 and the display equipment 104 are configured to support control elements having discrete function capability to control a state of a single component (e.g., as compared to multiple components).

The display equipment 104 and the processor 102 are further configured to implement macro-function capability. To implement the macro-function capability, the processor 102 may determine whether the electronic checklist 106 includes at least one checklist item associated with multiple components. For example, the processor 102 may determine that the electronic checklist 106 includes the third checklist item 204 associated with the components 132 and 133, the fourth checklist item 205 associated with the components 132 and 133, or both. In some implementations, the determination may be made based on data in the electronic checklist 106 indicating that particular items are associated with multiple components or data stored in the memory. When the electronic checklist 106 includes at least one checklist item (e.g., the third checklist item 204 or the fourth checklist item 205) that is associated with multiple components being configured in a particular (e.g., a same) state, the processor 102 may cause the display equipment 104 to display the macro-function control element 182. The macro-function control element 182 is associated with only a single checklist item a time, but may be associated with multiple checklist items during the course of completing the electronic checklist 106. For example, the macro-function control element 182 may be associated with the third checklist item 204 when the third checklist item 204 is active (e.g., is the next open checklist item or is the selected checklist item), and the macro-function control element 182 may be associated with the fourth checklist item 205 when the fourth checklist item 205 is active.

In some implementations, the macro-function control element 182 includes descriptive text 219 indicative of (e.g., describing) the components associated with an active checklist item that directs that multiple components be configured in particular states. For example, when the fourth checklist item 205 is active and the components 132 and 133 correspond to fuel jettison nozzles, the descriptive text 219 is indicative of the fuel jettison nozzles (e.g., the descriptive text 219 includes "JETT NOZZLES"). The processor 102 may be configured to change the descriptive text 219 during progression through the electronic checklist 106. For example, the third checklist item 204 may be associated with different components than the components associated with the fourth checklist item 205, and the descriptive text 219 when the third checklist item 204 is active may be indicative of the different components and may be different than the descriptive text 219 when the fourth checklist item 205 is active.

The processor 102 may cause the display equipment 104 to display the macro-function control element 182 when a checklist item associated with the macro-function control element 182 is active. For example, upon completion of the fuel to remain selection procedure corresponding to the second checklist item 203, the third checklist item 204 may be the next open checklist item based on an automated progression through the electronic checklist 106. Upon determining that the third checklist item 204 is the next open checklist item, the processor 102 determines which control page (or a control command thereof) corresponds to the next open checklist item. In the implementation illustrated in FIG. 2, the processor 102 determines that the first control page 108 also corresponds to the third checklist item 204. Additionally, in such implementations where the control element 272 (which corresponds to a previous checklist item) is displayed on the first control page 108 with an emphasized display property while the previous checklist item was active, the processor 102 may cause the control element 272 to be displayed with an unmodified display property, a de-emphasized display property or a de-activated display property while the third checklist item 204 is active. Alternatively, the processor 102 may remove the control element 272 from the first control page 108 while the third checklist item 204 is active. The processor 102 may cause the macro-function control element 182 associated with the third checklist item 204 to be displayed upon determining that the third checklist item 204 is the next open checklist item. Alternatively, the processor 102 may cause the macro-function control element 182 associated with the third checklist item 204 to be displayed responsive to a user selecting the third checklist item 204.

In some implementations, the processor 102 modifies a display property of the macro-function control element 182 to visually emphasize the macro-function control element 182, such as described with reference to FIG. 1. In a particular implementation, the processor 102 highlights the macro-function control element 182 while the third checklist item 204 is active.

As another example, upon completion of the fuel jettison procedure corresponding to the third checklist item 204, the fourth checklist item 205 may be the next open checklist item based on an automated progression through the electronic checklist 106. Upon determining that the fourth checklist item 205 is the next open checklist item, the processor 102 may cause the macro-function control element 182 associated with the fourth checklist item 205 to be displayed. Additionally, in such implementations where the macro-function control element 182 was displayed with an emphasized display property while the third checklist item 204 was active, the processor 102 may refrain from modifying (e.g., de-emphasizing) the emphasized display property while the fourth checklist item 205 is active. Alternatively, the processor 102 may cause the macro-function control element 182 associated with the fourth checklist item 205 to be displayed responsive to a user selecting the fourth checklist item 205.

In some implementations, the macro-function control element 182 is not displayed when a checklist item associated with multiple components is not active (e.g., is not the next open checklist item or is not the selected checklist item). For example, the macro-function control element 182 may not be displayed when the next open checklist item or the selected checklist item is the second checklist item 203. Alternatively or additionally, the macro-function control element 182 may be displayed but may be inactive (e.g., un-selectable) when a checklist item associated with multiple components is not active. For example, the macro-function control element 182 may be displayed but may be inactive when the next open checklist item or the selected checklist item is the second checklist item 203. Thus, the macro-function control element 182 may be displayed or may be active only when a checklist item associated with multiple components is the current checklist item.

Although the macro-function control element 182 is illustrated as being displayed on the control page, in other implementations, the macro-function control element 182 may be displayed within the electronic checklist 106 in addition to or in the alternative to being displayed on the control page. For example, the macro-function control element 182 may be displayed proximate to (e.g., on a same line as) the third checklist item 204.

The macro-function control element 182 is selectable to cause the control commands 162 and 164 of FIG. 1 to be sent to the components 132 and 133 (e.g., to multiple components of the subsystem). For example, the macro-function control element 182 is selectable to cause the control commands 162 and 164 to be sent to the components 132 and 133, thereby causing the components 132 and 133 to be configured according to the states indicated by or associated with the third checklist item 204 when the third checklist item 204 is active. As another example, the macro-function control element 182 is selectable to cause the control commands 162 and 164 to be sent to the components 132 and 133, thereby causing the components 132 and 133 to be configured according to the states indicated or associated with the fourth checklist item 205 when the fourth checklist item 205 is active.

In some implementations, the control commands 162 and 164 are sent to the components 132 and 133 in response to selection of the macro-function control element 182 (e.g., without receiving additional input at the display equipment 104). For example, selecting the macro-function control element 182 may cause the processor 102 to cause the subsystem controller 120 to send the control commands 162 and 164 to the components 132 and 133 without presenting a dialog window (e.g., a pop-up window) requesting additional input at the display equipment 104.

To illustrate, when the third checklist item 204 is the next open checklist item or the selected checklist item, the processor 102 may display the macro-function control element 182 associated with the third checklist item 204. A user may select the macro-function control element 182, such as by providing a touch input at a region of the first control page 108 (and of display equipment 104) corresponding to the macro-function control element 182. The processor 102 may send a signal (e.g., an instruction) to the subsystem controller 120 based on the macro-function control element 182 being selected. The signal indicates that the components 132 and 133 are to be configured in the ON state. In response to receiving the signal from the processor 102, the subsystem controller 120 may send the control commands 162 and 164 (e.g., multiple control commands) to the components 132 and 133 to cause each of the components 132 and 133 to be configured in the ON state.

Thus, the macro-function control element 182 may be selectable (e.g., via a touch input) to cause the control commands 162 and 164 to be sent to the multiple components 132 and 133. In some implementations, the macro-function control element 182 is selectable to send the control commands 162 and 164 to the components 132 and 133 in response to selection of the macro-function element (e.g., independent of a dialogue window). In other implementations, the control commands 162 and 164 are sent to the components 132 and 133 indirectly responsive to selection of the macro-function control element 182. For example, the macro-function control element 182 is selectable to cause the control commands 162 and 164 to be sent the components 132 and 133 based on (e.g., responsive to) input at a dialog window that is displayed responsive to selecting the macro-function control element 182 as described in further detail with reference to FIG. 4.

Figure 3:
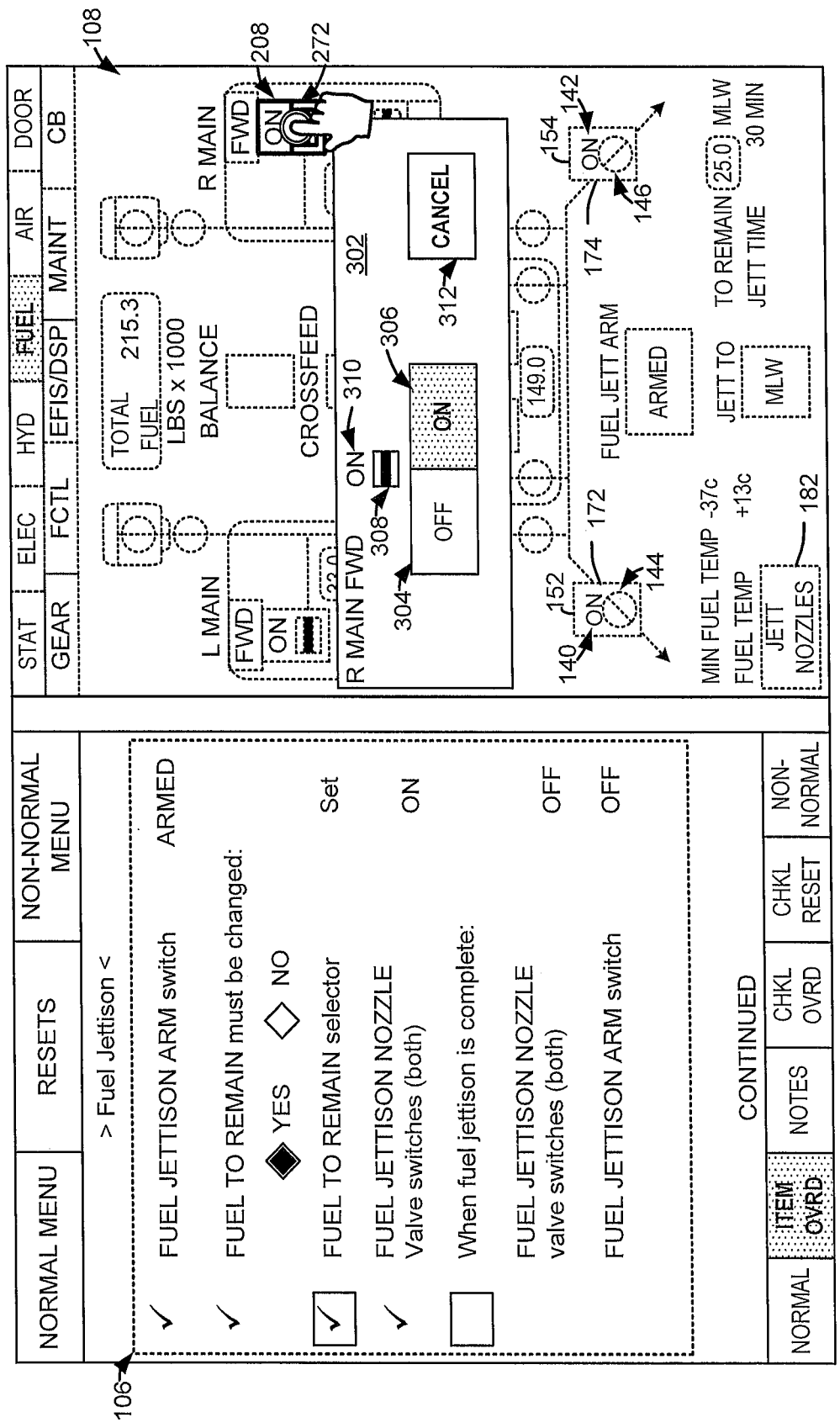
FIG. 3 illustrates an example of displaying, at the display system of FIG. 1, a dialog window during execution of a discrete function.

FIG. 3 illustrates an example of the display equipment 104 of FIG. 1 during execution of a particular control element associated with a discrete function. The display equipment 104 includes a dialog window (e.g., a pop-up window 302) that is displayed responsive to receiving an input at the region 208. The region 208 is associated with the control element 272 (e.g., the right main forward control element) and a single component (e.g., the right main forward component). Responsive to receiving the input at the region 208, portions of the first control page 108 other than the region 208 may be de-emphasized (e.g., grayed out) to emphasize the region 208 and the pop-up window 302.

The pop-up window 302 includes a symbolic representation 308 of the control element 272 (which indicates a state of the right main forward component associated with the region 208). The pop-up window 302 also includes text 310 indicative of a current state of the control element 272 and indicative of a current state the right main forward component associated with the region 208. The pop-up window 302 also displays multiple command instruction blocks. For example, the pop-up window 302 displays an OFF command instruction block 304, an ON command instruction block 306, and a CANCEL command instruction block 312. Configuration of the control element 272 causes configuration of the right main forward component to the same state.

In some implementations, the command instruction block corresponding to the current state of the corresponding control element 272 may be inactive (e.g., un-selectable). For example, because the control element 272 is in the ON state, the ON command instruction block 306 may be inactive. In such implementations, the OFF command instruction block 304 may be active and selection of the OFF command instruction block 304 may cause the control element 272 to be configured in the OFF state. To illustrate, the pop-up window 302 may be displayed responsive to receipt of an input at the region 208, and a user may select the OFF command instruction block 304. The processor 102 may detect selection of the OFF command instruction block 304, and responsive to detecting the selection, the processor 102 may send a signal (e.g., an instruction) to the subsystem controller 120 indicating that the right main forward component associated with the region 208 is to be configured in the OFF state. The subsystem controller 120 may send a control command signal to the right main forward component to cause the right main forward component to be configured in the OFF state.

Thus, the region 208 is selectable to control the control element 272 associated with the region 208. The first control page 108 therefore includes or incorporates discrete function capability by including at least one portion or region that is selectable to control a single component.

Figure 4:
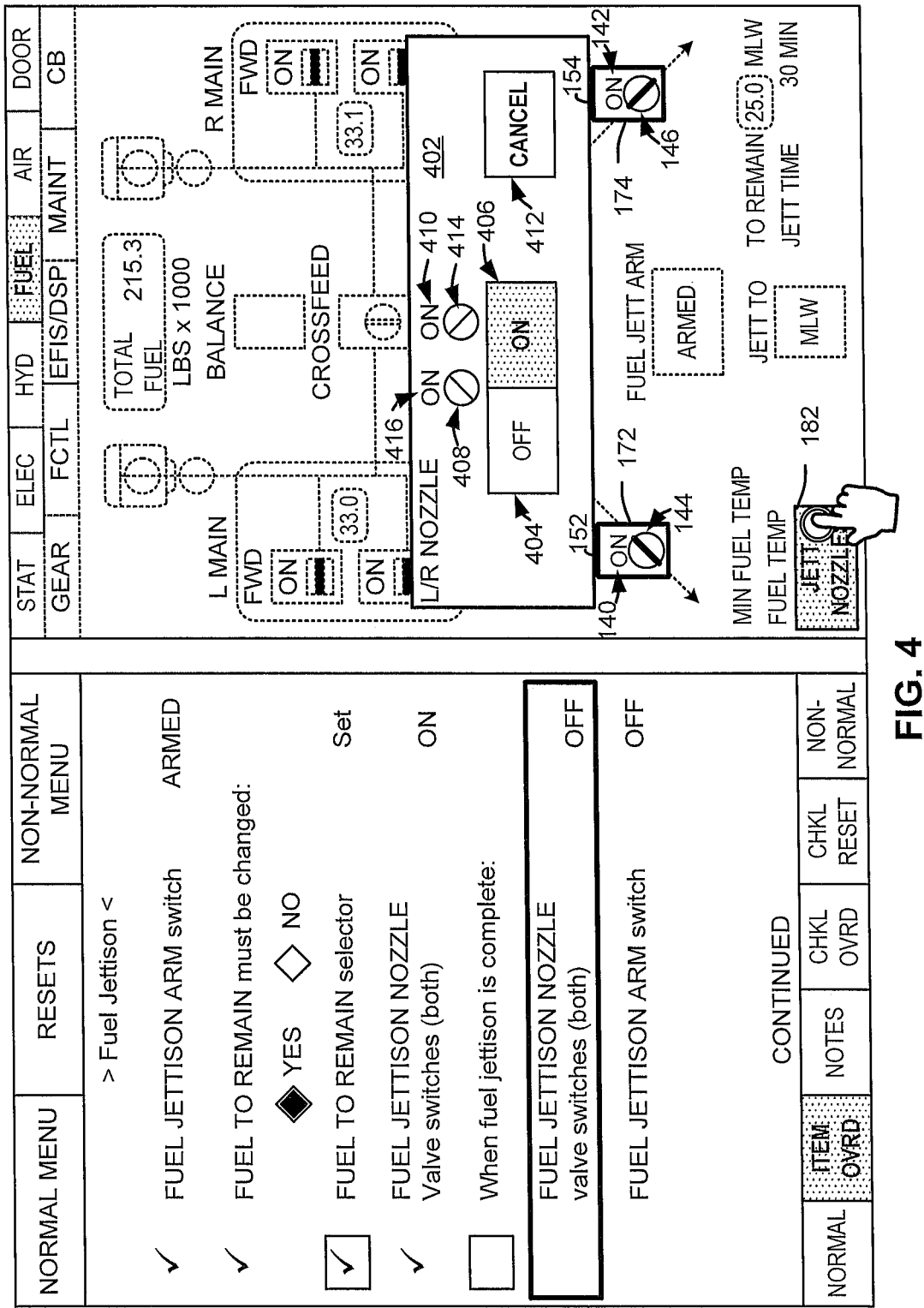
FIG. 4 illustrates an example of displaying, at the display system of FIG. 1, a dialog window during execution of a macro-function.

FIG. 4 illustrates an example of an electronic display of the display equipment 104 of FIG. 1 during execution of a macro-function. The display equipment 104 displays a pop-up window 402 responsive to selection of the macro-function control element 182. Responsive to selection of the macro-function control element 182, portions of the first control page 108 other than the macro-function control element 182 may be de-emphasized (e.g., grayed out) to emphasize the macro-function control element 182 and the pop-up window 402. The pop-up window 402 includes symbolic representations 408 and 414 of the multiple components 132 and 133. The pop-up window 402 also displays multiple command instruction blocks. For example, the pop-up window 402 displays an OFF command instruction block 404, an ON command instruction block 406, and a CANCEL command instruction block 412. The pop-up window 402 includes text 410 and 416 of the multiple components 132 and 133. The text 410 and 416 indicates command state information of the multiple components 132 and 133.

In some implementations, contents or functionality of the pop-up window 402 depend on determined states of the multiple components. For example, when the multiple components are determined to be in a particular state (e.g., the same state), the command instruction block corresponding to the state of the corresponding control element or component may be inactive (e.g., un-selectable). To illustrate, the ON command instruction block 406 may be inactive (e.g., un-selectable) based on the processor 102 determining that the components 132 and 133 are both in the ON state.

Alternatively or additionally, when the components 132 and 133 are determined to be in different states, the command instruction blocks corresponding to both states are active. For example, when the processor 102 determines that the component 132 is in the ON state and the component 133 is in the OFF state, the OFF command instruction block 404 and the ON command instruction block 406 may both be active. The processor 102 may be configured to cause the subsystem controller 120 to send control commands (e.g., control signals) to the components that are not in the selected state. To illustrate, when a user selects the OFF command instruction block 404 in the example above, the processor 102 may send a signal to the subsystem controller 120 indicating that the component 132 is to be configured in the OFF state, thereby causing the subsystem controller 120 to send a control command to the component 132 to configure the component 132 in the OFF state. Alternatively or additionally, the processor 102 may be configured to cause the subsystem controller 120 to send control commands to all of the components associated with the macro-function control element 182 regardless of a current state of the component. For example, when a user selects the OFF command instruction block 404 in the example above, the processor 102 may send a signal to the subsystem controller 120 indicating that the components 132 and 133 are to be configured in the OFF state, thereby causing the subsystem controller 120 to send a control command to the components 132 and 133 to configure the components 132 and 133 in the OFF state.

Additionally or alternatively, the command instruction block corresponding to a state other than the state associated with the active checklist item may be inactive (e.g., un-selectable). For example, the active checklist item may be the fourth checklist item 205 and the components 132 and 133 may both be in the ON state. In this example, the ON command instruction block 406 may be inactive, and the OFF command instruction block 404 may be active (e.g., selectable) to cause the components 132 and 133 to be configured in the OFF state. To illustrate, the pop-up window 402 may be displayed responsive to receiving the input (e.g., a touch input) at the macro-function control element 182. A user may select the OFF command instruction block 404 (e.g., by providing touch input). The processor 102 may detect selection of the OFF command instruction block 404, and the processor 102 may send a signal (e.g., an instruction) to the subsystem controller 120 indicating that the components 132 and 133 are to be configured in the OFF state. The subsystem controller 120 may send commands to the components 132 and 133 to cause the components 132 and 133 to be configured in the OFF state.

Thus, a pop-up window 402 may be displayed responsive to selection of the macro-function control element 182. A single command instruction block of the pop-up window 402 may be selected to cause control commands to be sent to multiple components (e.g., to the components 132 and 133) to control states of the multiple components.

Figure 5:
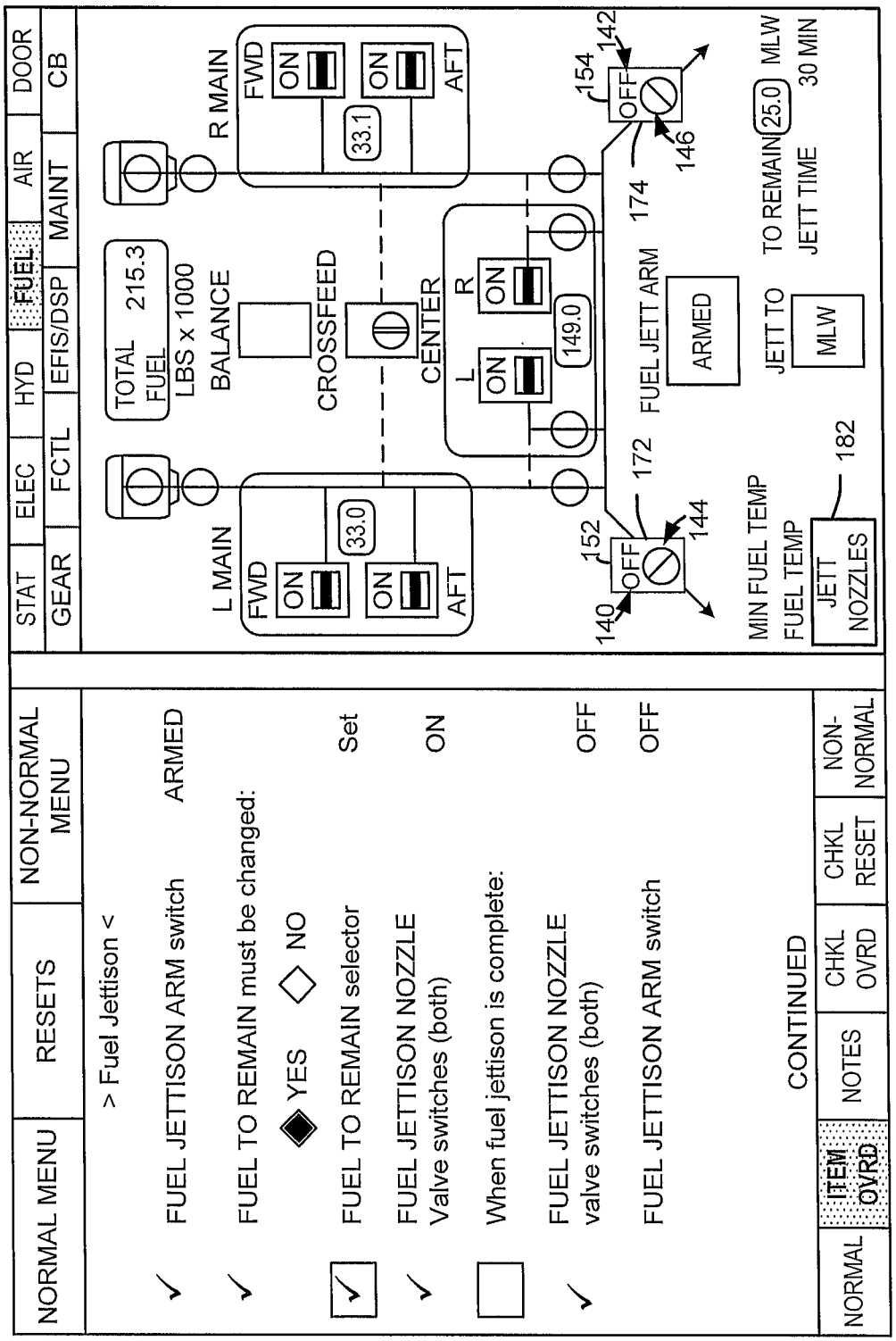
FIG. 5 illustrates an example of the displayed control elements of FIG. 2 subsequent to executing the macro-function to set multiple components to a same state.

FIG. 5 illustrates an example of an electronic display of the display equipment 104 of FIG. 1 subsequent to selection of the OFF command instruction block 404 of FIG. 4. Responsive to selection of the OFF command instruction block 404 of FIG. 4, the components 132 and 133 may be configured in the OFF state (e.g., may be changed from the ON state to the OFF state). The processor 102 may detect, or receive an indication, that the components 132 and 133 are configured in the OFF state, and the processor 102 may cause the first control page 108 to adjust the component state data and the command state data corresponding to the multiple components to indicate the detected state of the multiple components. For example, responsive to detecting, or receiving an indication, that the components 132 and 133 are in the OFF state, the processor 102 may cause the text 140 and 142 associated with the components 132 and 133 to read 'OFF' and may cause the symbols 144 and 146 associated with the components 132 and 133 to symbolically indicate that the components 132 and 133 are configured in the OFF state.

Upon completion of an active checklist item, the processor 102 may cause the electronic checklist 106 to indicate completion of the completed checklist item and may move to a next open checklist item. For example, upon completion of the fourth checklist item 205, the processor 102 may cause the electronic checklist 106 to display an indication (e.g., a mark, such as a check mark) proximate to (e.g., on a same line as) the fourth checklist item 205. In this example, upon completion of the fourth checklist item 205, the processor 102 may move to the fifth checklist item 206. For example, upon completion of the fourth checklist item 205, the processor 102 may emphasize the fifth checklist item 206 on the electronic display and may determine whether the fifth checklist item 206 is associated with multiple components. In this example, the fifth checklist item 206 is not associated with multiple components, thereby resulting in the processor 102 omitting display of the macro-function control element 182 or rendering the macro-function control element 182 inactive (e.g., un-selectable).

FIG. 6 illustrates an example of an electronic display of the display equipment 104 of FIG. 1 after de-selection of a function of the macro-function that is associated with the fourth checklist item 205. The electronic display includes the pop-up window 402 of FIG. 4 modified based on input on the first control page 108. For example, the processor 102 causes an indication of a state of one component (e.g., a de-selected component) of the components 132 and 133 to be removed from the pop-up window 402 and the processor 102 dis-associates the command instruction block in the pop-up window 402 and the de-selected component, thereby bypassing or disabling a function of the macro-function that is associated with the de-selected component (e.g., thereby disabling control of the de-selected component via the pop-up window 402).

In some implementations, the indication of the state of the de-selected component is removed after the pop-up window 402 is displayed. To illustrate, the pop-up window 402 may be displayed to include the text 410 and 416 (e.g., command state data) associated with the component 132 and the symbolic representations 408 and 414 (e.g., component state data) associated with the component 133, as described with reference to FIG. 4. While the pop-up window 402 is displayed, a user may provide input at the region 154 of the first control page 108 corresponding to the component 133 (e.g., a de-selected component). In response to the input at the region 154, the processor 102 may remove the component and command state data corresponding to the de-selected component 133 from the pop-up window 402, as illustrated in FIG. 6. Additionally or alternatively, the processor 102 may, in response to the input at the region 154, disable or bypass the function (of the macro-function) that is associated with the de-selected component 133 such that input at the pop-up window 402 does not control a state of the component 133.

To illustrate, after receiving the input at the region 154 to disable or bypass the function associated with the de-selected component 133, the processor 102 may, responsive to selection of the OFF command instruction block 404, send a signal (e.g., an instruction) to the subsystem controller 120 indicating that the component 132 is to be configured in the OFF state. The signal may not indicate that the component 133 is to be configured in the OFF state. The subsystem controller 120 may, responsive to the signal from the processor 102, send a control command to the component 132 to cause the component 132 to be configured in the OFF state and may not send a control command to the component 133. Thus, the component 132 is turned off responsive to selection of the OFF command instruction block 404 and the component 133 is not turned off responsive to selection of the OFF command instruction block 404.

Thus, the processor 102 is configured to remove state data from the pop-up window responsive to input at a particular portion of the first control page 108 corresponding to a component (e.g., a de-selected component) of the multiple components. The processor 102 is additionally configured to bypass or disable one or more functions of a macro-function that are associated with the de-selected component such that the subsystem controller 120 does not send a command instruction to the de-selected component responsive to selection of a command instruction block on the pop-up window. Thus, the macro-function is configurable via input at the first control page 108 to de-select one or more functions of the macro-function.

Figure 7:
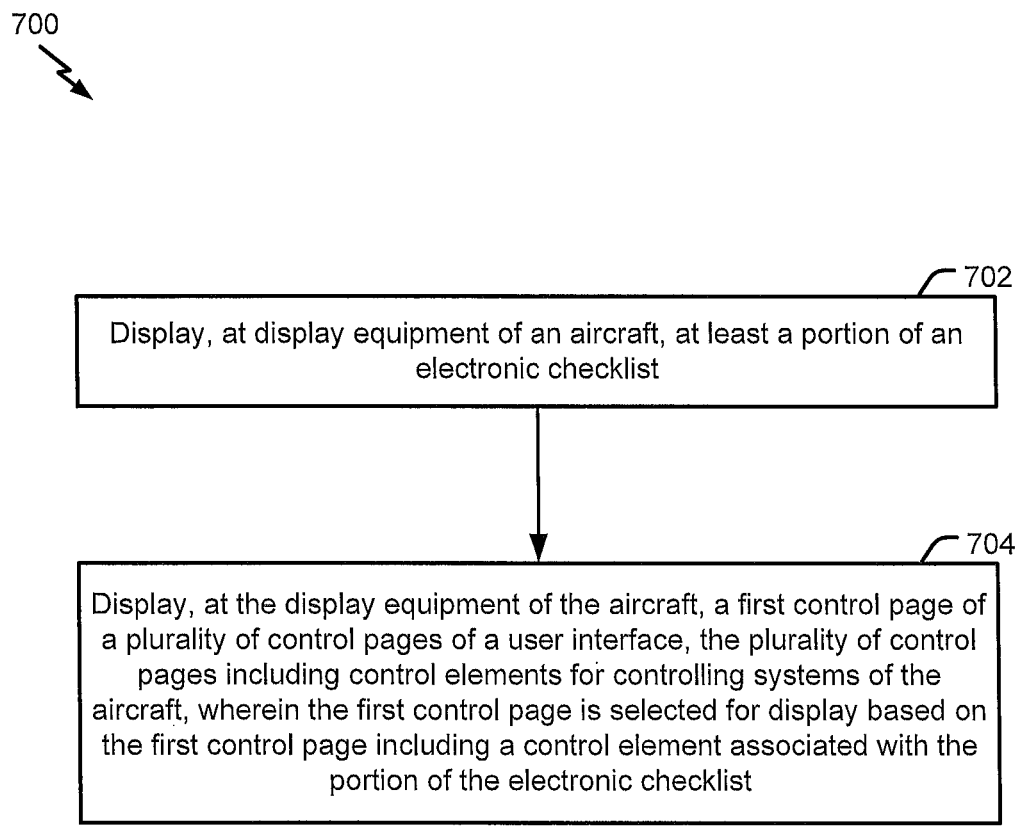
FIG. 7 illustrates a method of displaying a control page including a control element associated with an electronic checklist.

FIG. 7 illustrates a method 700 of displaying a control page including a control element associated with an electronic checklist. The method 700 may be performed by the aircraft 101 of FIG. 1, the display system 110 of FIG. 1, or the processor 102 of FIG. 1. The method 700 includes, at 702, displaying, at display equipment of an aircraft, at least a portion of an electronic checklist. The aircraft may include or correspond to the aircraft 101 of FIG. 1. The display equipment may include or correspond to the display equipment 104 of FIG. 1. The electronic checklist may include or correspond to the electronic checklist 106 of FIG. 1, and the portion of the electronic checklist may include or correspond to one or more of the checklist items 112, 114, . . . N of FIG. 1 and the checklist item 202-206 of FIG. 2.

The method 700 of FIG. 7 further includes, at 704, displaying, at the display equipment of the aircraft, a first control page of a plurality of control pages of a user interface. The plurality of control pages include control elements which control systems of the aircraft. The first control page is selected for display based on the first control page including a control element associated with the portion of the electronic checklist. The plurality of control pages may include or correspond to the first control page 108 of FIG. 1 and the second control page 109 of FIG. 1, and the first control page may include or correspond to the first control page 108 of FIG. 1 or the second control page 109 of FIG. 1. The control elements may include or correspond to the control elements 172-178 and 182 of FIG. 1 and the control element 272 of FIG. 2, and the control element may include or correspond to the first control element 172, the second control element 174, the third control element 176, the fourth control element 178, the macro-function control element 182 of FIG. 1, or the control element 272 of FIG. 2. In some implementations, one or more control pages of the plurality of control pages include or correspond to a synoptic page (e.g., a page that provides an overview of command state information and/or control state information of a system or a subsystem).

The display equipment 104 includes one or more touchscreen displays. In some implementations at least the portion of the electronic checklist 106 is displayed on a first touchscreen display of the display equipment 104 and the first control page 108 is displayed on a second touchscreen display of the display equipment 104. Alternatively, the electronic checklist 106 and the first control page 108 are displayed on the same touchscreen display of the display equipment 104.

In some implementations, the first control page includes a plurality of control elements including the control element. In such implementations, the method 700 also includes displaying a subset of control elements of the plurality of control elements of the first control page based on an active item of the electronic checklist. As explained with reference to FIG. 1, the processor 102 is configured to remove control elements that do not correspond to active item from display via the display equipment 104.

In some implementations, the one or more control elements of the first control page are displayed at the display equipment with a display property to visually emphasize the one or more control elements, based on the active item of the electronic checklist, based on one or more uncompleted items of the electronic checklist, or a combination thereof. As explained with reference to FIG. 1, the processor 102 is configured to visually emphasize a display property of a region corresponding to a control element, command state information within the region, control state information within the region, or a combination thereof. A display property to be emphasized may include size, blinking, backlighting, color, highlighting (e.g., background color), font, font styles (e.g., bold, italics, underline), etc.

Additionally or alternatively, one or more control elements of the first control page are displayed at the display equipment with a display property to visually de-emphasize the one or more control elements, based on the active item of the electronic checklist, based on one or more completed items of the electronic checklist, based on one or more uncompleted items of the electronic checklist, or a combination thereof. As explained with reference to FIG. 1, the processor 102 is configured to visually de-emphasize a display property of a region corresponding to a control element, command state information within the region, control state information within the region, or a combination thereof. As illustrative illustrations, a de-emphasized control may have text that include strikethroughs, red highlighting, text or symbols that are grayed out, etc.

Additionally or alternatively, the method 700 further includes deactivating one or more control elements of the first control page displayed at the display equipment based on the active item of the electronic checklist, based on one or more completed items of the electronic checklist, based on one or more uncompleted items of the electronic checklist, or a combination thereof. As explained with reference to FIG. 1, the processor 102 is configured to refrain from generating control signals based on control elements that do not correspond to active item.

In some implementations, the method 700 also includes, responsive to determining completion of an active item of the electronic checklist (or of the portion of the electronic checklist), determining that a second item of the electronic checklist is associated with a second control page of the plurality of control pages. The second control page is different from the first control page. For example, the processor 102 receives (e.g., from the subsystem controller 120) an indication or an update that the checklist item is completed. As another example, the processor 102 determines completion of the checklist item 112 based on a user input indicating that the checklist item 112 has been completed. As yet another example, the processor 102 determines completion of the checklist item 112 via input at the region 152 of the first control page corresponding to the first control element 172. The method 700 further includes, responsive to determining that the second item of the electronic checklist is associated with the second control page, displaying the second control page of the plurality of control pages. For example, the processor 102 causes the display equipment 104 to display the second control page 109, as described with reference to FIG. 1.

In some implementations, the method 700 also includes, responsive to receiving a selection of a second item of the electronic checklist, determining that the second item of the electronic checklist is associated with a second control page of the plurality of control pages. The second control page is different from the first control page. The method 700 further includes responsive to determining that the second item of the electronic checklist is associated with the second control page, displaying the second control page of the plurality of control pages.

In some implementations, the method 700 also includes, responsive to determining that a second item of the electronic checklist is associated with the first control page, displaying a modified first control page. The modified first control page includes a second control element having an emphasized display property and includes the control element having an unmodified, de-emphasized, or deactivated display property. For example, referring to FIG. 2, the processor 102 may determine that the fifth checklist item 206 (which follows the fourth checklist item 205) also corresponds to the first control page 108. The processor 102 may modify the first control page 108 displayed at the display equipment 104 to de-emphasize a visual property of the regions 152 and 154 and to emphasize a visual property of a region corresponding to the "Fuel Jett Arm" control element.

In some implementations, the method 700 also includes sending control commands to multiple components responsive to selection of the control element. The control element includes a macro-function control element. For example, the processor 102 may send the control commands 166 and 168 to the components 136 and 137 responsive to receiving an input at a region corresponding to the macro-function control element 182, as described with reference to FIG. 1

In some implementations, the method 700 also includes displaying, at the display equipment, a pop-up window responsive to selection of the control element. Contents of the pop-up window are based on determined states of components corresponding to the control element. For example, the processor 102 displays the pop-up window 302 or 402 responsive to selection of a control element, as described with reference to FIGS. 3-6.

In some implementations, the method 700 also includes removing, from the pop-up window, an indication of a state for a component of the components, disabling control of the component via the pop-up window, or both. For example, the processor 102 removes the symbolic representations 414 (e.g., the component state data) from the pop-up window 402, or the processor 102 disables the first control element 172 or a function of the macro-function control element 182, as described with reference to FIG. 6. In such implementations, the indication is removed and the control of the one component via the pop-up window is disabled responsive to input at the first control page after the pop-up window is displayed. In a particular implementation, the input is provided at a portion of the first control page associated with a representation of the one component.

In some implementations, the method 700 includes modifying a control page based on a position of a switch. The switch may include two or more selectable positions, such as a first positon that corresponds to a default control setting in which one or more control elements of the particular control page are displayed with a modified display property based on the electronic checklist and a second position that corresponds to an override control setting in which modified display properties of control elements are disabled and the one or more control elements of the particular control page are displayed independent of the electronic checklist. For example, the processor 102 may modify a displayed control page to remove emphasized visual properties, remove de-emphasized visual properties, activate (or re-active) de-activated control elements, replace removed control elements, or a combination thereof, based on the switch being moved from the first positon to the second position.

In a particular implementation, switch includes a third position that corresponds to a user defined control setting. The processor 102 may be configured to modify display properties of one or more control elements of a particular displayed control page based on the user defined preference data responsive to the switch being in the third positon.

Figure 8:
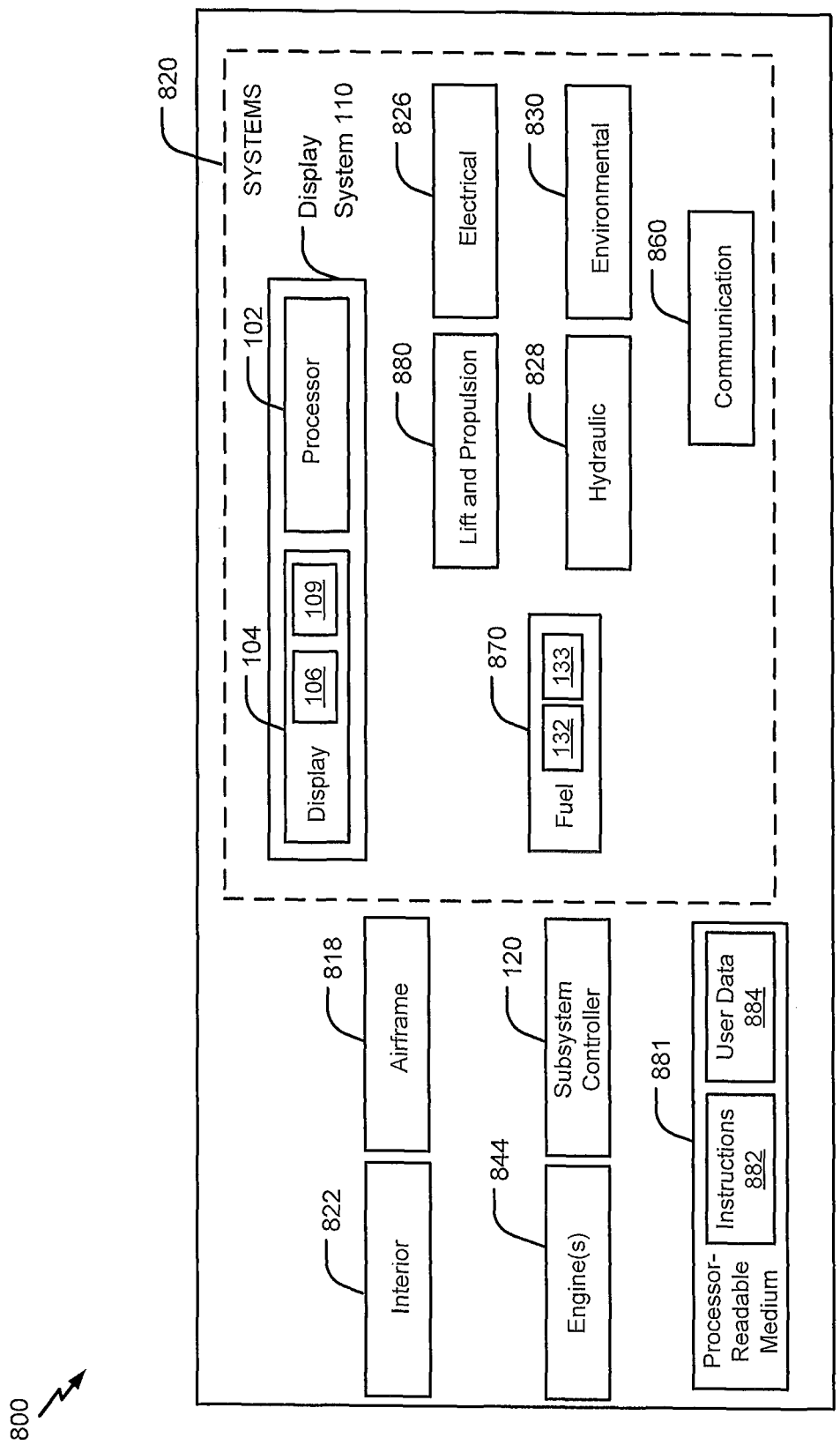
FIG. 8 is a block diagram of an illustrative implementation of an aircraft that includes the display system of FIG. 1.

Referring to FIG. 8, a block diagram 800 of an illustrative implementation of the aircraft 101 that includes the display system 110. As shown in FIG. 8, the aircraft 101 includes an airframe 818, an interior 822, one or more engines 844 (which may include or correspond to the components 136 and 137), a subsystem controller 120, a non-transitory processor-readable medium 881 storing instructions 882, and a plurality of systems 820. The systems 820 may include one or more of a lift and propulsion system 880, an electrical system 826, a hydraulic system 828, an environmental system 830, the display system 110 that includes the processor 102 and the display equipment 104, a communication system 860, and a fuel system 870 that includes the components 132 and 133. Any number of other systems may be included. The one or more engines 844 may be part of the lift and propulsion system 880. Although the components 132 and 133 are illustrated as part of the fuel system 870, the components 132 and 133 may correspond to multiple components of the lift and propulsion system 880, the electrical system 826, the hydraulic system 828, the environmental system 830, the one or more engines 844, the communication system 860, or a combination thereof.

The instructions 882, when executed by the processor 102, may cause the processor 102 to perform any of the functions described above. For example, the instructions 882, when executed by the processor 102, may cause the processor 102 to cause the display equipment 104 of the aircraft 101 to display at least a portion of the electronic checklist 106, as described above with reference to FIGS. 1-7. The instructions 882, when executed by the processor 102, may cause the processor 102 to cause the display equipment 104 to display the first control page 108 of a plurality of control pages, the plurality of control pages including control elements for controlling systems of the aircraft 101, where the first control page 108 is selected for display based on the first control page 108 including the first control element 172 associated with the portion of the electronic checklist, as described above with reference to FIGS. 1-7. The processor 102 may, in response to one or more inputs by an operator (e.g., input by the operator selecting the macro-function control element 182), send one or more commands to the subsystem controller 120 or to the components to change state(s) of one or more components of one or more of the systems 820 of FIG. 8.

In some implementations, the processor 102 is configured to modify the display of a control page based on user data 884 (e.g., user defined preference data. For example, responsive to a user moving a selector switch (e.g., the selector switch 105 of FIG. 1) to a position (e.g., the third position of FIG. 1) corresponding to a user defined control setting, the processor 102 causes the display equipment 104 of the aircraft 101 to modify display of one or more control elements of the a displayed control page. The one or more control elements may be modified by adjusting a display property of the one or more control elements to emphasize or de-emphasize the one or more control elements. Additionally or alternatively, the processor 102 may cause the display equipment to deactivate or remove the one or more control elements. In addition, the processor 102 is configured to generate or modify the user data 884 based on user input to enable a user to customize the display properties of control elements that are displayed on a control page during a performance of the electronic checklist 106.

In another implementation, the instructions 882, when executed by the processor 102, cause the processor 102 to cause the display equipment 104 of the aircraft 101 to display at least a portion of the electronic checklist 106 and the first control page 108 of a plurality of control pages of a user interface. The electronic checklist 106 includes a first checklist item (e.g., the checklist item 112) associated with a first component (e.g., component 133) of the aircraft 101 and a second checklist item (e.g., the checklist item 114) associated with a second component (e.g., the component 136, the component 167, or both) of the aircraft 101. The plurality of control pages include control elements (e.g., the control elements 172-178 and 182) which control components of the aircraft, and the first control page 108 corresponds to the first checklist item (e.g., the checklist item 112), as described above with reference to FIGS. 1-7.

The instructions 882, when executed by the processor 102, cause the processor 102 to, responsive to determining completion of the first checklist item (e.g., the checklist item 112), automatically cause the display equipment 104 to display the second control page 109 of the plurality of control pages based on the second checklist item (e.g., the checklist item 114) of the electronic checklist 106 being associated with the second control page 109, as described above with reference to FIGS. 1-7. In a particular implementation, the display system 110 is a display system of an aircraft simulator and the components of the aircraft are virtual components of the aircraft simulator. In some implementations, the second control page 109 includes a control element (e.g., the control element 176, 178, or 182) that is selectable to cause a control command to be sent to the second component. The processor 102 may, in response to one or more inputs by an operator (e.g., input by the operator selecting a control element, such as the macro-function control element 182), send one or more commands to the subsystem controller 120 or to one or more components of one or more of the systems 820 of FIG. 8. In some implementations, each checklist item of the electronic checklist 106 includes an indicator associated with one or more components of the aircraft.

Although the implementations described above are described with reference to an aircraft environment, the electronic checklist systems and methods described herein can be implemented in other environments, such as in different vehicles (e.g., submarines, spacecraft, etc.) or in fixed location environments (e.g., power plants, chemical plants, or manufacturing plants). For example, the subsystems associated with the electronic checklist system described above with reference to FIGS. 1-8 may correspond to subsystems of a submarine, a spacecraft, or a power plant, and the multiple components described above with reference to FIGS. 1-8 may correspond to multiple components of the subsystems of the submarine, the spacecraft, or the power plant, respectively. In these implementations, the electronic checklist systems and methods described above with reference to FIGS. 1-8 enable control of one more components of the subsystems of the submarine, the spacecraft, or the power plant by using control elements displayed on the electronic display, as described above with respect to the aircraft environment.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
    displaying, at a first portion of a display equipment of an aircraft, at least a portion of an electronic checklist;
    displaying, at a second portion of the display equipment of the aircraft, a plurality of control elements of a first control page of a plurality of control pages of a user interface concurrently with the portion of the electronic checklist at the first portion of the display equipment, the plurality of control elements corresponding to a graphical representation of at least one control system of the aircraft, the plurality of control elements comprising a first control element and a second control element;

receiving a selection of the second control element while the first control element is an active item of the electronic checklist, wherein no control commands are sent to one or more components of the at least one control system of the aircraft in response to the selection of the second control element responsive to the first control element being the active item of the electronic checklist;

sending at least one control command to one or more components of the at least one control system of the aircraft responsive to a selection of the first control element of the plurality of control elements while the first control element is the active item of the electronic checklist;

responsive to determining completion of the active item of the electronic checklist, determining that a third item of the electronic checklist is associated with a second control page of the plurality of control pages, the second control page different from the first control page; and responsive to determining that the third item of the electronic checklist is associated with the second control page, displaying, at the second portion, at least one control element of the second control page of the plurality of control pages concurrently with the portion of the electronic checklist at the first portion, wherein the second control page is distinct from the first control page, wherein the second portion includes control elements from a single control page at a time, wherein the plurality of control elements is associated with a first system of the aircraft, and wherein the second control page includes a second plurality of control elements associated with a second system of the aircraft, and wherein the first system is distinct from the second system.

2. The method of claim 1, wherein the first control page comprises a synoptic page.

3. The method of claim 1, further comprising displaying a subset of control elements of the plurality of control elements of the first control page based on the active item of the electronic checklist.

4. The method of claim 1, further comprising modifying a display property of the first control element based on the electronic checklist.

5. The method of claim 1, wherein the second control element of the plurality of control elements of the first control page is displayed at the display equipment with a display property to visually de-emphasize the second control element based on the active item of the electronic checklist, based on one or more completed items of the electronic checklist, based on one or more uncompleted items of the electronic checklist, or a combination thereof.

6. The method of claim 1, further comprising deactivating the first control element of the first control page displayed at the display equipment responsive to the active item changing to a third control element.

7. The method of claim 1, wherein the first system corresponds to a fuel system, and wherein the second system corresponds to an engine system.

8. The method of claim 1, further comprising
responsive to receiving a selection of a second item of the electronic checklist, determining that the second item of the electronic checklist is associated with a second control page of the plurality of control pages, the second control page different from the first control page; and responsive to determining that the second item of the electronic checklist is associated with the second control page, displaying at least one control element of the second control page of the plurality of control pages.

9. The method of claim 1, further comprising, responsive to determining that a third item of the electronic checklist is associated with the first control page, displaying a second control element having an emphasized display property and the plurality of control elements having an unmodified, de-emphasized, or deactivated display property.

10. The method of claim 1, wherein at least one of the plurality of control elements comprises a macro-function control element.

11. The method of claim 1, further comprising displaying, at the display equipment, a pop-up window responsive to selection of the plurality of control elements, wherein contents of the pop-up window are based on determined states of components corresponding to the plurality of control elements.

12. The method of claim 11, further comprising removing, from the pop-up window, an indication of a state for a component of the components, disabling control of the component via the pop-up window, or both, wherein the first control page comprises a synoptic page, and wherein the indication is removed and the control of the component via the pop-up window is disabled responsive to input at the synoptic page after the pop-up window is displayed.

13. A system comprising:
display equipment; and
a processor coupled to the display equipment, the processor configured to:
cause the display equipment to display at least a portion of an electronic checklist associated with an aircraft at a first portion of the display equipment;
cause the display equipment to display a plurality of control elements of a first control page of a plurality of control pages at a second portion of the display equipment concurrently with the portion of the electronic checklist at the first portion of the display equipment, the plurality of control elements corresponding to a graphical representation of at least one control system of the aircraft, the plurality of control elements comprising a first control element and a second control element;
receive a selection of the second control element while the first control element is an active item of the electronic checklist, wherein no control commands are sent to one or more components of the at least one control system of the aircraft in response to the selection of the second control element responsive to the first control element being the active item of the electronic checklist;
cause a subsystem controller to send one or more control commands to one or more components of the aircraft responsive to a selection of the first control element of the plurality of control elements while the first control element is the active item of the electronic checklist;
responsive to determining completion of the active item of the electronic checklist, determine that a third item of the electronic checklist is associated with a second control page of the plurality of control pages, the second control page different from the first control page; and
responsive to determining that the third item of the electronic checklist is associated with the second control page, cause the display equipment to display at least one control element of the second control page of the plurality of control pages at the second portion concurrently with the portion of the electronic checklist at the first portion, wherein the second control page is distinct from the first control page, wherein the second portion includes control elements from a single control page at a time, wherein the plurality of control elements is associated with a first system of the aircraft, and wherein the second control page includes a second plurality of control elements associated with a second system of the aircraft, and wherein the first system is distinct from the second system.

14. The system of claim 13, further comprising a switch including two or more selectable positions, wherein a first position of the switch corresponds to a default control setting in which the plurality of control elements are displayed with a modified display property based on the electronic checklist, wherein a second position of the switch corresponds to an override control setting in which modified display properties of the plurality of control elements are disabled and the plurality of control elements are displayed independent of the electronic checklist.

15. The system of claim 14, wherein a third position of the switch corresponds to a user defined control setting, and wherein the processor is further configured to create user defined preference data responsive to receiving user input.

16. The system of claim 15, wherein the processor is further configured to modify display properties of the plurality of control elements of a particular displayed control page based on the user defined preference data responsive to the switch being in the third position.

17. The system of claim 13, wherein the display equipment includes one or more touchscreen displays, and wherein the processor is further configured to display at least a portion of the electronic checklist on a first touchscreen display of the display equipment and to display the plurality of control elements on a second touchscreen display of the display equipment.

18. A non-transitory processor-readable medium storing processor-executable instructions that, when executed by a processor, cause the processor to:
cause display equipment of an aircraft to display at least a portion of an electronic checklist at a first portion of the display equipment;
cause the display equipment to display a plurality of control elements of a first control page of a plurality of control pages at a second portion of the display equipment concurrently with the portion of the electronic checklist at the first portion of the display equipment, the plurality of control elements corresponding to a graphical representation of at least one control system of the aircraft, the plurality of control elements comprising a first control element and a second control element;
receive a selection of the second control element while the first control element is an active item of the electronic checklist, wherein no control commands are sent to one or more components of the at least one control system of the aircraft in response to the selection of the second control element responsive to the first control element being the active item of the electronic checklist;
cause a subsystem controller to send one or more control commands to one or more components of the aircraft responsive to a selection of the first control element of the plurality of control elements while the first control element is the active item of the electronic checklist
responsive to determining completion of the active item of the electronic checklist, determine that a third item of the electronic checklist is associated with a second control page of the plurality of control pages, the second control page different from the first control page; and
responsive to determining that the third item of the electronic checklist is associated with the second control page, cause the display equipment to display at least one control element of the second control page of the plurality of control pages at the second portion concurrently with the portion of the electronic checklist at the first portion, wherein the second control page is distinct from the first control page, wherein the second portion includes control elements from a single control page at a time, wherein the plurality of control elements is associated with a first system of the aircraft, and wherein the second control page includes a second plurality of control elements associated with a second system of the aircraft, and wherein the first system is distinct from the second system.

19. The non-transitory processor-readable medium of claim 18, wherein the first system corresponds to a fuel system, and wherein the second system corresponds to an electrical system.

20. The non-transitory processor-readable medium of claim 18, wherein a third control element of the plurality of control elements of the first control page is displayed with a display property to visually de-emphasize the second control element based on an active item of the electronic checklist, based on one or more completed items of the electronic checklist, based on one or more uncompleted items of the electronic checklist, or a combination thereof.

* * * * *